United States Patent
Cawthon

(10) Patent No.: US 7,954,183 B2
(45) Date of Patent: *Jun. 7, 2011

(54) COMBINATION GAME CLEANING STATION, PORTABLE SINK AND ICE CHEST

(76) Inventor: Gregory Stuart Cawthon, Mobile, AL (US)

(*) Notice: Subject to any disclaimer, the term of this patent is extended or adjusted under 35 U.S.C. 154(b) by 4 days.

This patent is subject to a terminal disclaimer.

(21) Appl. No.: 11/020,284

(22) Filed: Dec. 23, 2004

(65) Prior Publication Data

US 2006/0137379 A1 Jun. 29, 2006

Related U.S. Application Data

(63) Continuation-in-part of application No. 10/212,246, filed on Aug. 6, 2002, now Pat. No. 6,836,910.

(51) Int. Cl.
*E03C 1/14* (2006.01)
*E03C 1/18* (2006.01)
*E03C 1/182* (2006.01)

(52) U.S. Cl. ............. 4/650; 4/643; 4/644; 4/646; 4/652; 4/654

(58) Field of Classification Search .............. 4/619, 625, 4/626, 628, 638, 639, 643, 644, 646, 650, 4/652–654, 656
See application file for complete search history.

(56) References Cited

U.S. PATENT DOCUMENTS

| | | | |
|---|---|---|---|
| 602,494 A | 4/1898 | Briggs | |
| 1,420,511 A | 6/1922 | Armstrong | |
| 2,308,123 A * | 1/1943 | Stein | 4/638 |
| 2,594,938 A | 4/1952 | Leavitt | |
| 3,041,957 A | 7/1962 | Liptay | |
| 3,566,856 A | 3/1971 | Linstead | |
| 3,594,830 A | 7/1971 | Clifton | |
| 3,748,437 A | 7/1973 | Keeshin et al. | |
| 3,915,529 A | 10/1975 | Bernier | |
| 4,213,309 A | 7/1980 | Pifer | |
| 4,341,164 A | 7/1982 | Johnson | |
| 4,440,185 A | 4/1984 | Wiltse | |
| 4,670,144 A | 6/1987 | McCausland et al. | |
| 4,720,879 A | 1/1988 | Rabban | |
| 4,747,169 A | 5/1988 | Valbuena | |
| 4,766,621 A | 8/1988 | Rasor | |
| 4,934,280 A | 6/1990 | Bae | |
| 5,301,376 A | 4/1994 | Herbert | |

(Continued)

FOREIGN PATENT DOCUMENTS

JP 4-92034 3/1992

(Continued)

*Primary Examiner* — Tuan N Nguyen
(74) *Attorney, Agent, or Firm* — J. John Shimazaki

(57) ABSTRACT

The present invention relates to a portable sink or container with a lid that is preferably capable of closing and sealing the sink or container. In certain embodiments, the sink is preferably adapted to be connected to an existing water supply, such as an outdoor hose or faucet, such that running water can be provided inside the sink in an outdoor environment. The sink or container preferably has features that make it easy to use in an outdoor environment, such as folding legs, an adjustable spigot, a spray nozzle, a storage drawer, a shelf, a drain, a funnel, a strainer for the drain, cutting boards, baskets, etc. In one aspect, the sink preferably has handles that support utility panels that can be folded up or down on top of the sink or container.

18 Claims, 22 Drawing Sheets

U.S. PATENT DOCUMENTS

| | | |
|---|---|---|
| 5,313,676 A | 5/1994 | Wright |
| 5,349,708 A | 9/1994 | Lee |
| 5,502,848 A | 4/1996 | Cowan |
| 5,526,539 A | 6/1996 | Bower et al. |
| 5,566,404 A | 10/1996 | Laughton |
| 5,683,157 A | 11/1997 | Peterson et al. |
| 5,813,063 A | 9/1998 | Watkins et al. |
| 5,881,404 A | 3/1999 | Knight |
| 5,926,866 A | 7/1999 | Chao |
| 6,161,228 A * | 12/2000 | Wietecha ............ 4/625 |
| 6,173,458 B1 * | 1/2001 | Maddux ............. 4/626 |
| 6,611,972 B2 * | 9/2003 | Underbrink et al. ........ 4/619 |
| 6,836,910 B2 * | 1/2005 | Cawthon ............ 4/650 |

FOREIGN PATENT DOCUMENTS

| | | |
|---|---|---|
| JP | 5-9962 | 1/1993 |

* cited by examiner

COMBINATION GAME CLEANING STATION, PORTABLE SINK AND ICE CHEST

RELATED APPLICATIONS

This application is a continuation in part of and claims the benefit of the filing date of U.S. patent application Ser. No. 10/212,246, filed on Aug. 6, 2002, which issued as U.S. Pat. No. 6,836,910, on Jan. 4, 2005, which claims the benefit of the filing date of U.S. patent application Ser. No. 09/645,927, filed on Aug. 25, 2000, which issued as U.S. Pat. No. 6,427,259, on Aug. 6, 2002, which claims the benefit of the filing date of U.S. Provisional Application Ser. No. 60/163,659, filed on Nov. 5, 1999.

FIELD OF THE INVENTION

The present invention relates to the field of outdoor appliances, and in particular, to an outdoor portable sink or container that can be used to clean fish and game.

BACKGROUND OF THE INVENTION

Many outdoor activities, such as hunting, fishing, camping, etc., involve clean-up requirements for which an outdoor sink would be desirable. Although many campgrounds have running water via an outdoor faucet, most outdoor areas do not have outdoor sinks where clean-up tasks, such as cleaning fish and game, washing pots and pans, etc., can be done. Moreover, although most homes have outdoor water faucets (i.e., for attaching to garden hoses), they do not have outdoor sinks for clean-up tasks such as painting projects, washing dogs, potting plants, etc.

Some attempts have been made in the past to provide portable sinks that can be used outdoors. For example, in Leavitt, U.S. Pat. No. 2,594,938, a portable camping sink that includes a tank and tub hinged together, that can be locked together during transportation, and placed in an open position during use, is disclosed. The tank contains water used to provide the tub (sink) with its own water supply. Also, in Valbuena, U.S. Pat. No. 4,747,169, a portable camping sink with a pressurized water supply is disclosed. The sink has a main case and an open top with a hinged cover. Valbuena also provides its own water supply so that it can be used much like a sink at home. Another attempt relates to a portable kitchen unit that includes a detachable sink, shown in Peterson et al., U.S. Pat. No. 5,683,157. This sink is said to have many uses, including as a lid, lock, wash basin, stand, table, storage bin, etc. This sink, however, does not have its own water supply, and has no means of providing water; it simply shows a container that serves as a sink basin.

What is needed, therefore, is a portable sink or container that can not only be easily transported and set up in an outdoor environment, but that also preferably has several optional and desirable features, including without limitation, legs that unfold to support the sink, a connection to an existing water supply, a spray nozzle for spraying water, an adjustable spigot, storage for various utensils and appliances, ledges for supporting cutting boards, shelves on the inside of a lid cover, fold-down panels, funnel/strainer assemblies, detachable faucet assemblies, double wall construction for enabling the sink to double as an ice chest, etc.

SUMMARY OF THE INVENTION

The present invention relates to a portable sink or container that is preferably capable of being connected to an existing water supply, such as an outdoor hose, such that running water can be provided inside the sink in an outdoor environment. The present invention preferably has many optional features, including legs that unfold to support the sink in an elevated position, an adjustable spigot that can be lowered and raised depending on whether the lid on the sink is opened or closed, a handle for the spigot to control the flow of water into the sink, a spray nozzle for providing a controlled spray of water which can be useful for cleaning purposes, a storage drawer for storing various utensils and appliances, a shelf extending from the lid which is adapted to be level when the lid is opened, a large drain for allowing water and debris in the sink to be easily drained out, funnels that can be extended from the drain to direct water in the appropriate direction, strainers for straining debris flowing out of the sink, supports within the sink capable of allowing cutting boards and baskets to be supported thereon, hinged utility panels that can be folded on each side and supported by handles to create a larger work space, a funnel/strainer having a size sufficient to hold fish and game debris that can be inserted into and/or hung down from the drain, double wall construction that enables the sink to double as a portable ice chest, a detachable faucet assembly capable of being connected to a hose and supported on the lid, an opening to allow a hose to be extended into the sink and connected to a separate faucet assembly, and a lid that enables the sink to be used as a container for storing items during travel, etc. A pressurized water tank can also be provided which is preferably sized to fit inside the sink and adapted to supply water where no other water supply exists.

BRIEF DESCRIPTION OF THE DRAWINGS

FIGS. 14 and 15 show different views of another embodiment with an opening on the lid to allow the hose to extend through.

DETAILED DESCRIPTION OF THE INVENTION

Figure 1:
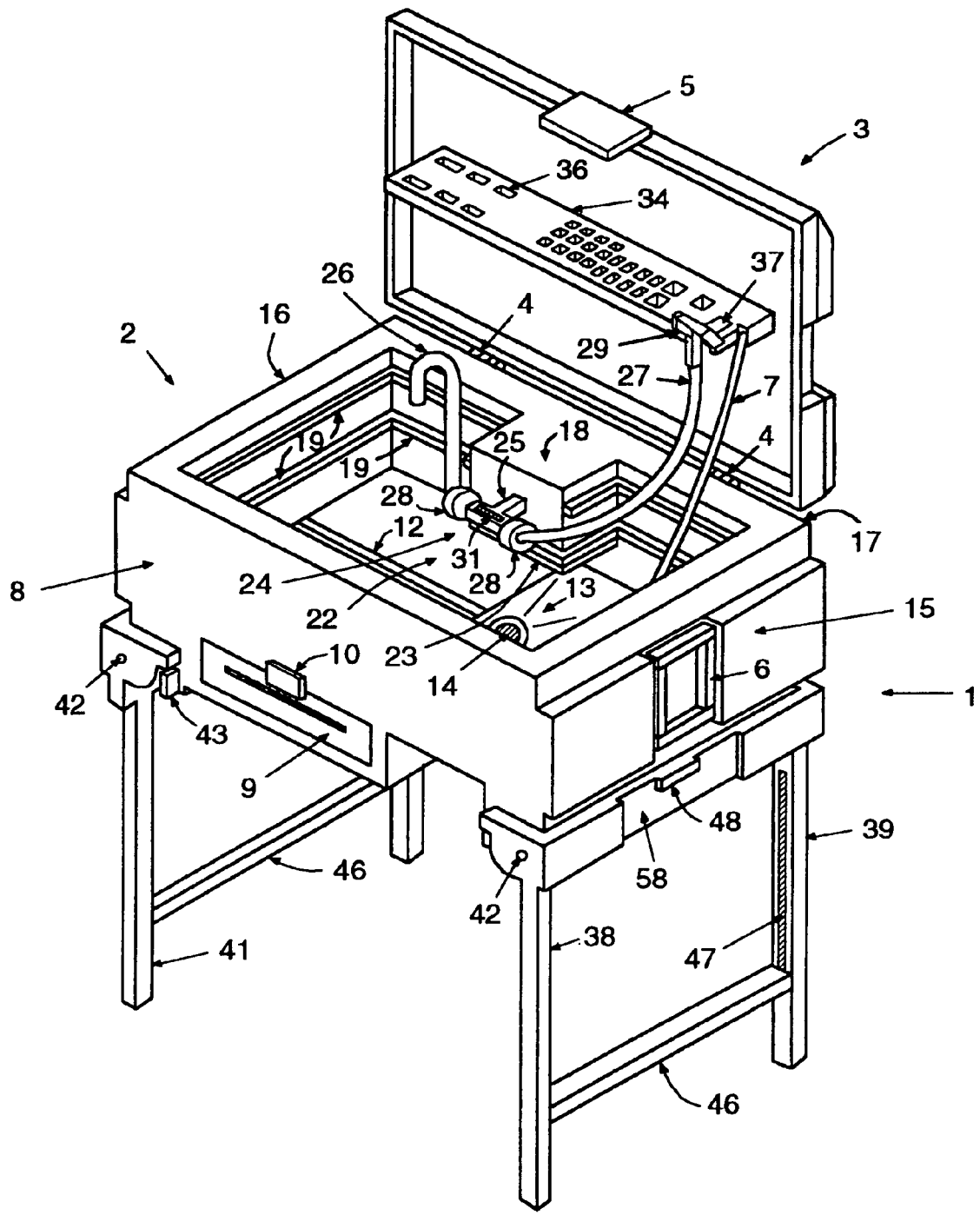
FIG. 1 is a perspective view of the present invention.

As shown in FIG. 1, the present invention relates to a portable sink 1 preferably having a sink portion 2 and lid 3 connected by hinges 4 such that lid 3 can be opened and closed. When lid 4 is closed, a latch 5 is preferably provided to secure lid 3 on sink portion 2. When lid 3 is opened, a stop 7 is preferably provided which limits the opening of the lid. The stop 7 can be a cord or chain, as is known in the art, which is hooked at one end to the sink portion 2 and the other end to the lid 3 as shown in FIG. 1. A built-in stopping means can also be provided on hinges 4.

Figure 6:
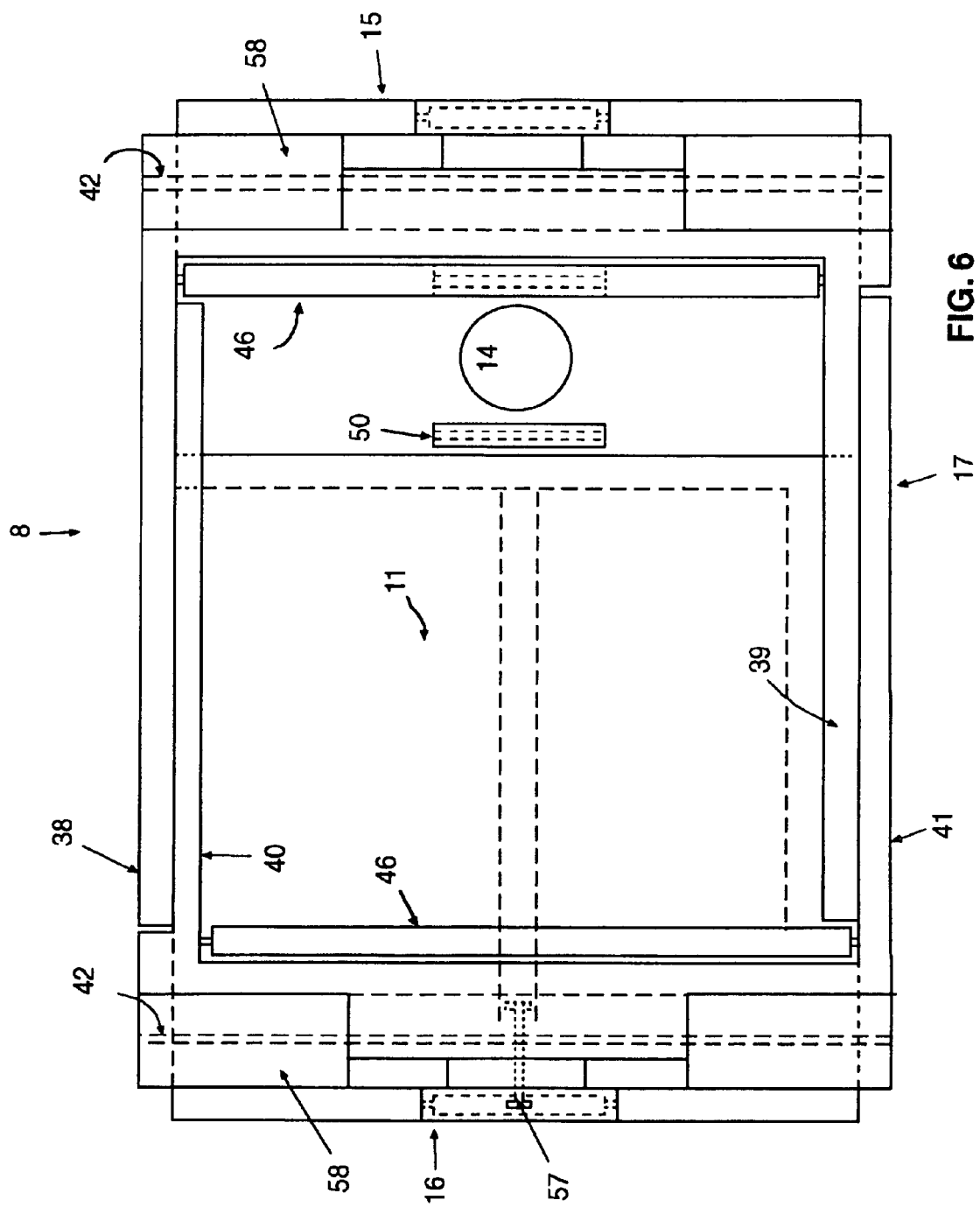
FIG. 6 is a bottom view of the present invention with legs folded.
Figure 7:
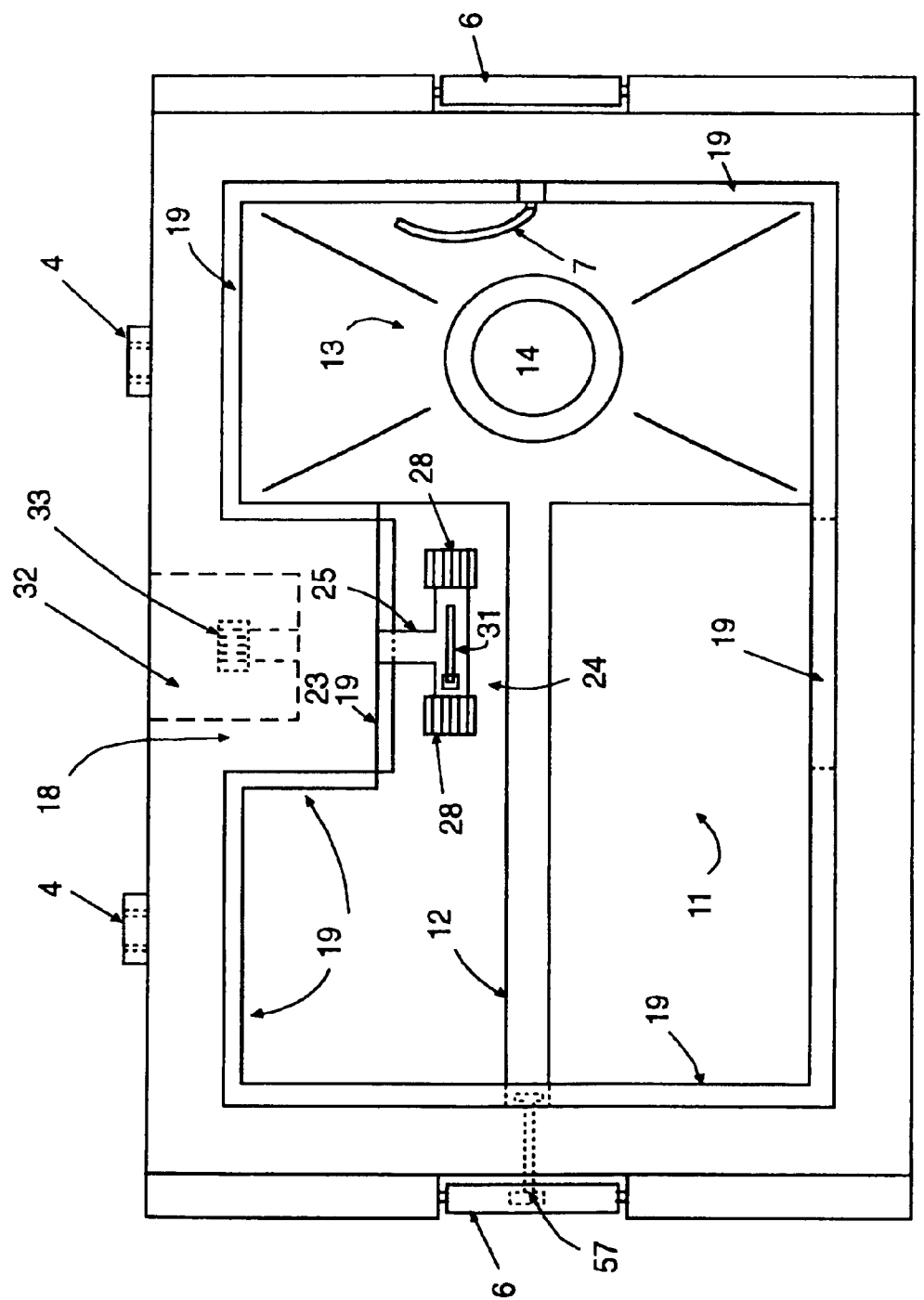
FIG. 7 is a top view of the present invention without lid.
Figure 16:
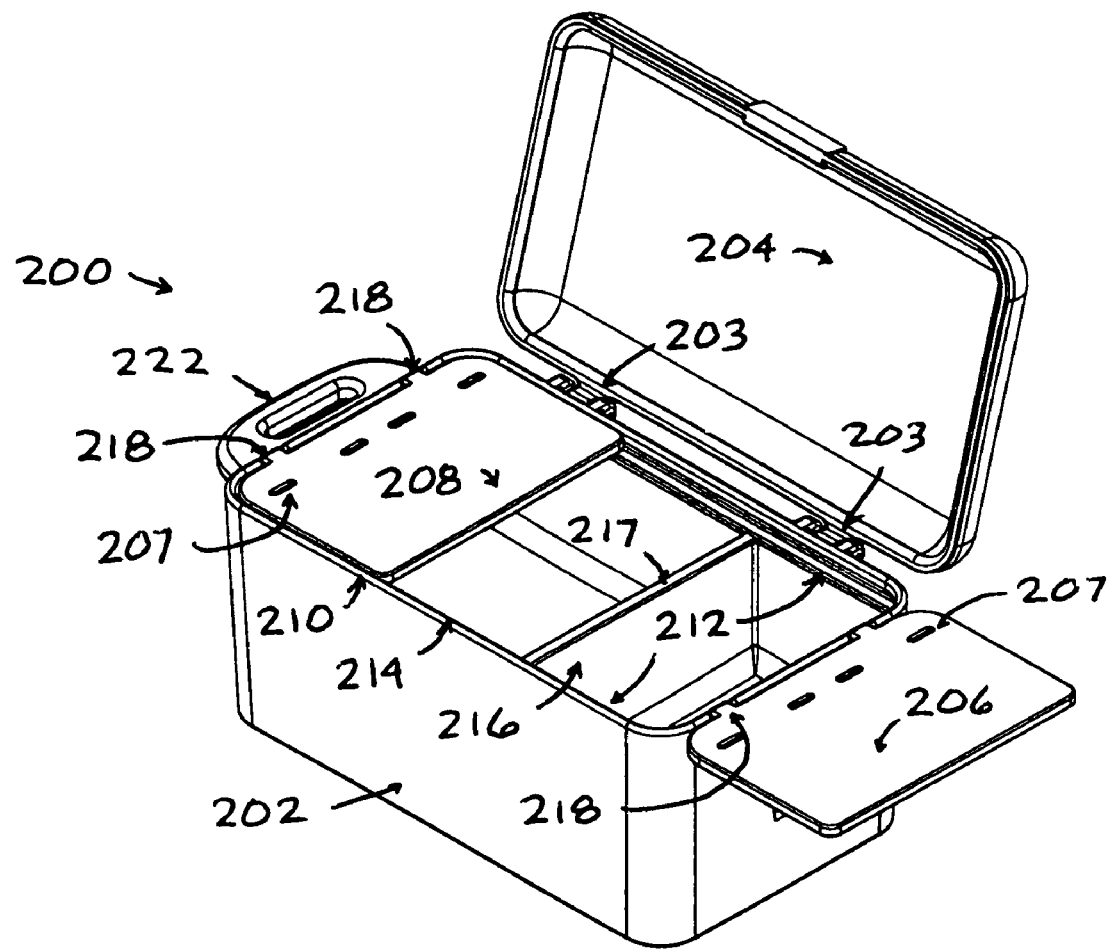
FIGS. 16 to 18 show a container embodiment with hinged utility panels and fixed handles to support the panels.
Figure 17:
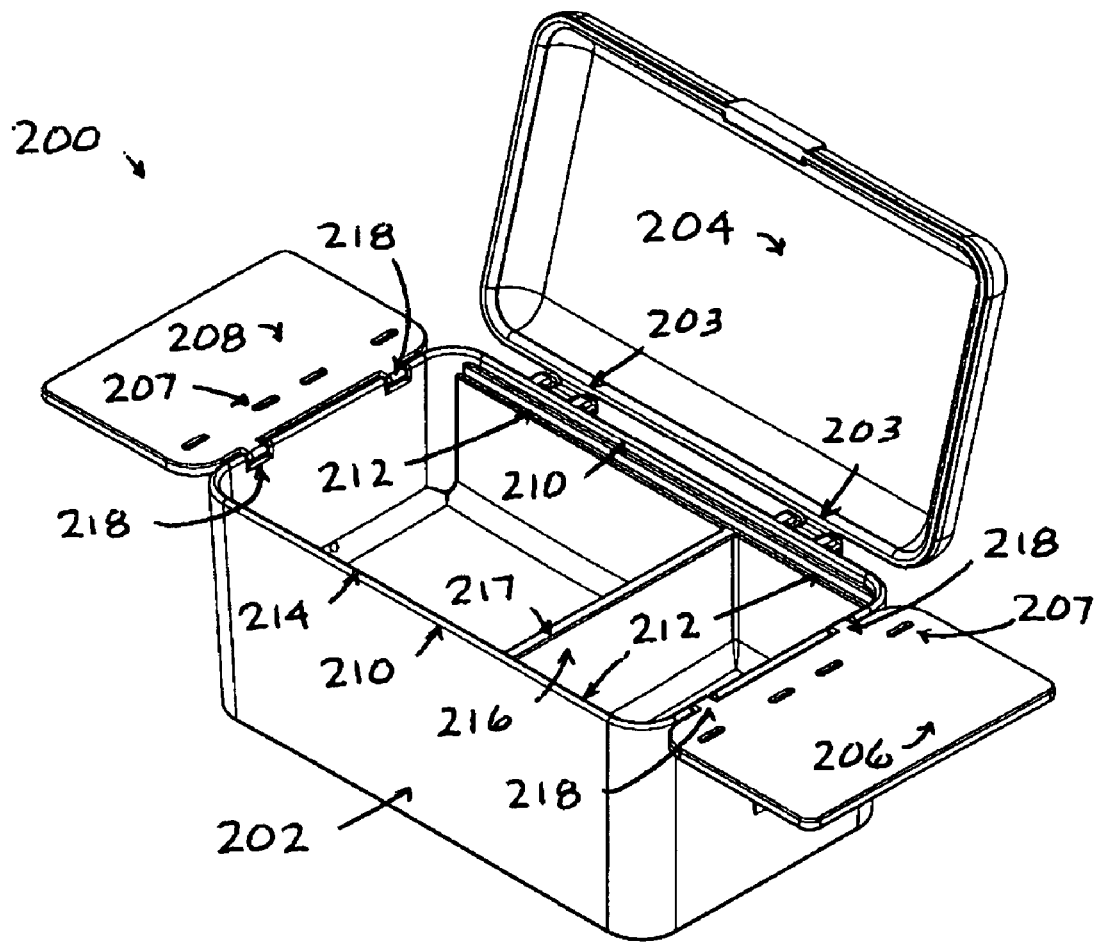
Figure 18:
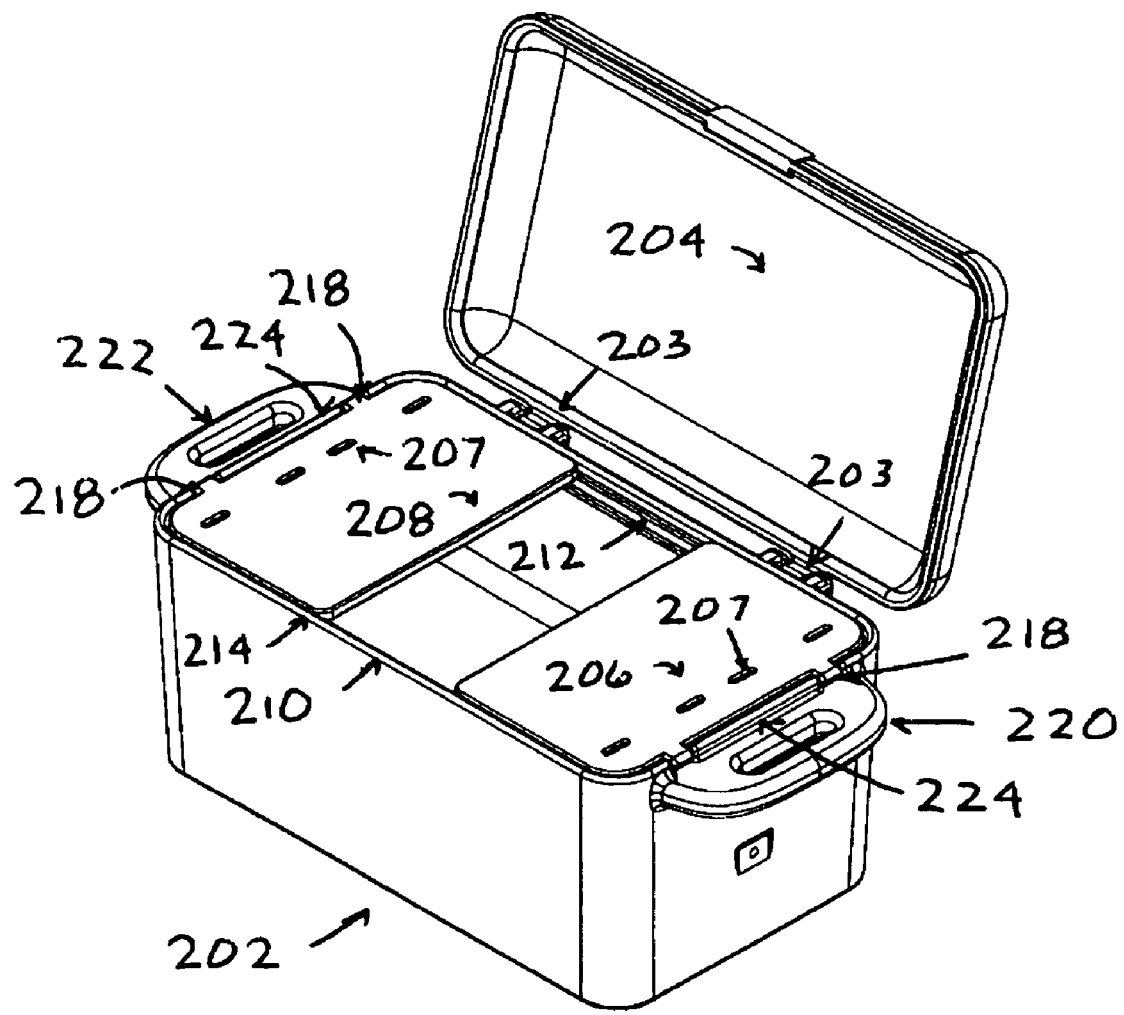

Sink portion 2 is preferably comprised of a body having sidewalls 8, 15, 16, 17 and a floor 11 as shown in FIGS. 6-7. In one embodiment, the body can be comprised of double-wall construction, similar to an ice chest, such that the sink can double as an ice chest, and items can be stored and kept cold inside. It preferably has handles 6 on either side, which can be used to carry sink 1. Handles 6 can be any conventional type, including, for example, a loop style handle connected at both ends by a hinge, which can be swung up from the sink portion 2, as is known in the art, or, as shown in FIGS. 16-18, the handles 220, 222 can be fixed.

Figure 2:
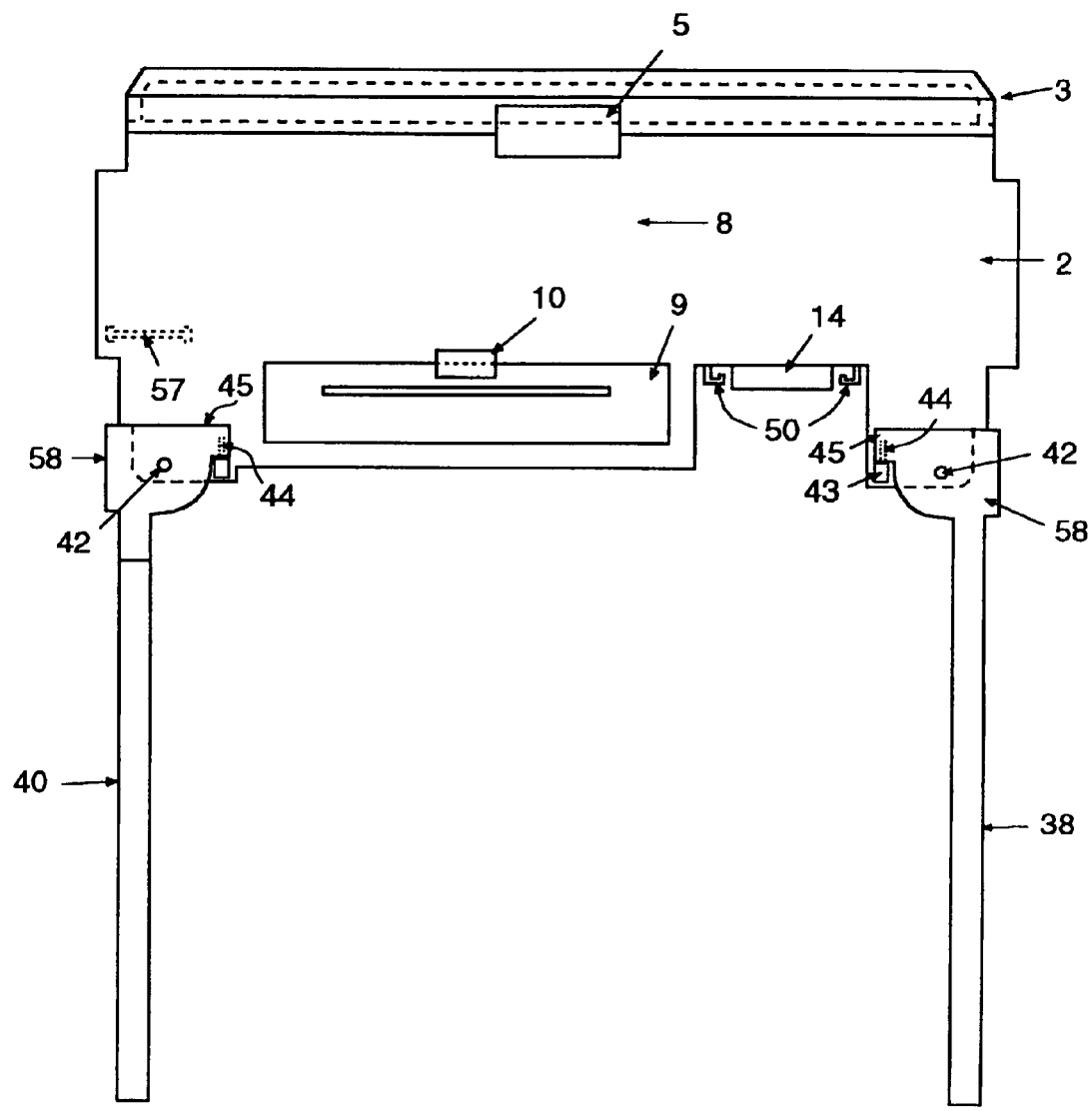
FIG. 2 is a front view of the present invention.

Sink portion 2 is preferably substantially in the shape of a rectangular box or container as shown in FIG. 1. Front wall 8 is preferably provided with an opening, with a drawer 9 inside having a latch 10, as shown in FIGS. 1-2, to secure the drawer in a closed position, i.e., such as during transportation. Drawer 9 is preferably built into an opening formed on front wall 8 which extends into a cavity formed in floor 11 of sink portion 2. Drawer 9 can be made to slide in and out of sink portion 2 in any conventional manner. Drawer 9 also preferably has means for opening the drawer such as a handle or groove.

The top surface of floor 11 preferably has a groove 12 or channel extending along the center on one side thereof, as shown in FIG. 7. Groove 12 is preferably sloped and helps guide water on top of floor 11 into drain area 13. Drain area 13 is preferably sloped downward toward and around a drain 14. Preferably, drain 14 is located at the lowest point of the upper surface of floor 11 to allow water to drain out of sink portion 2 by gravity alone. Drain 14 is preferably large enough to allow debris to pass, such as fish and game parts, etc. Preferably, drain 14 has a diameter greater than that of a standard sink, with a preferred diameter being about 5 or more inches.

Figure 5:
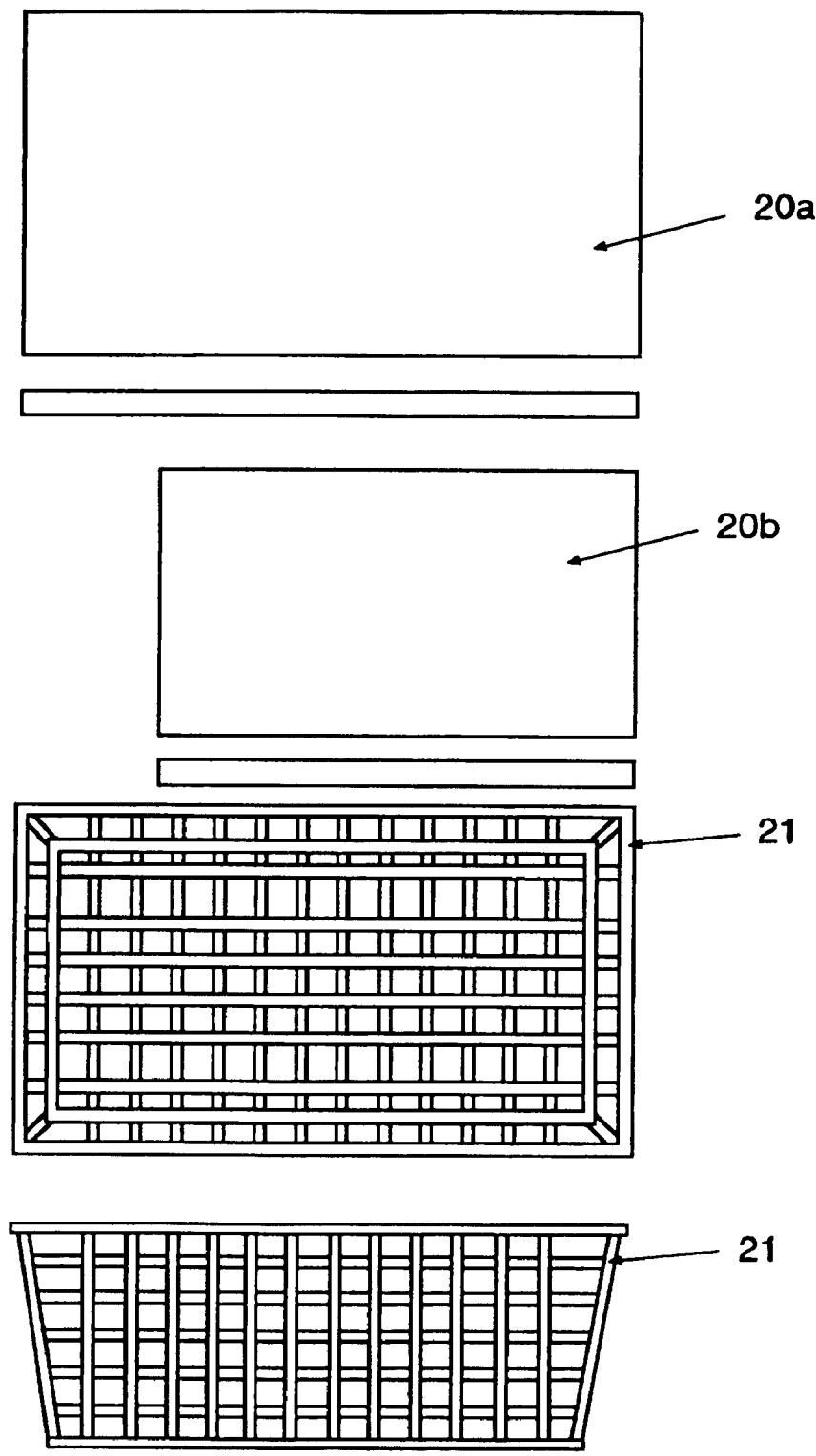
FIG. 5 shows cutting boards and baskets that can be used in the present invention.
Figure 8:
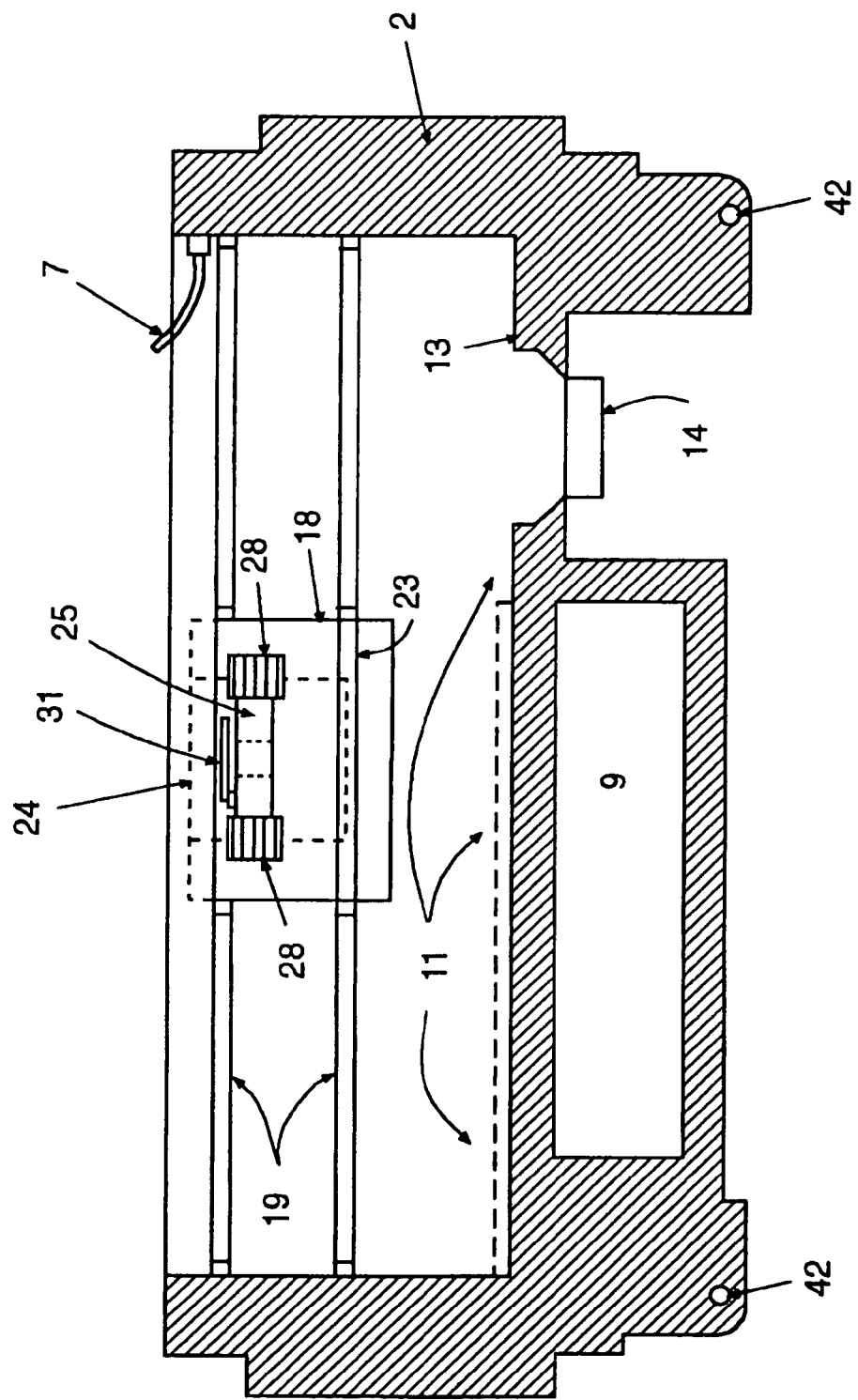
FIG. 8 is a section view of the present invention.

In the embodiment of FIG. 1, walls 8, 15, 16 and 17 preferably form a substantially rectangular shaped box, although not necessarily so, with a center section 18 extending in from the center of wall 17, as shown in FIG. 1. Along the internal surface of walls 8, 15, 16 and 17, as well as portions of center section 18, there are preferably one or more ledges 19 to support auxiliary items, such as cutting boards 20, baskets 21, as shown in FIG. 5, and dish racks, etc. Two different size cutting boards, 20a and 20b, can be provided, i.e., a large cutting board 20a can be adapted to fit in sink portion 2 on either side of center section 18, and a small cutting board 20b can be adapted to fit within a central space 22, shown in FIG. 1, in front of center section 18, spanning between wall 8 and section 18. There are preferably two ledges 19 on sink portion 2, one at a relatively low level, and one at a relatively high level, of walls 8, 15, 16, 17. The center section 18 preferably has only one lower level ledge 23, as shown in FIG. 8, to allow room for faucet assembly 24, which extends from the front of center section 18.

Figure 11:
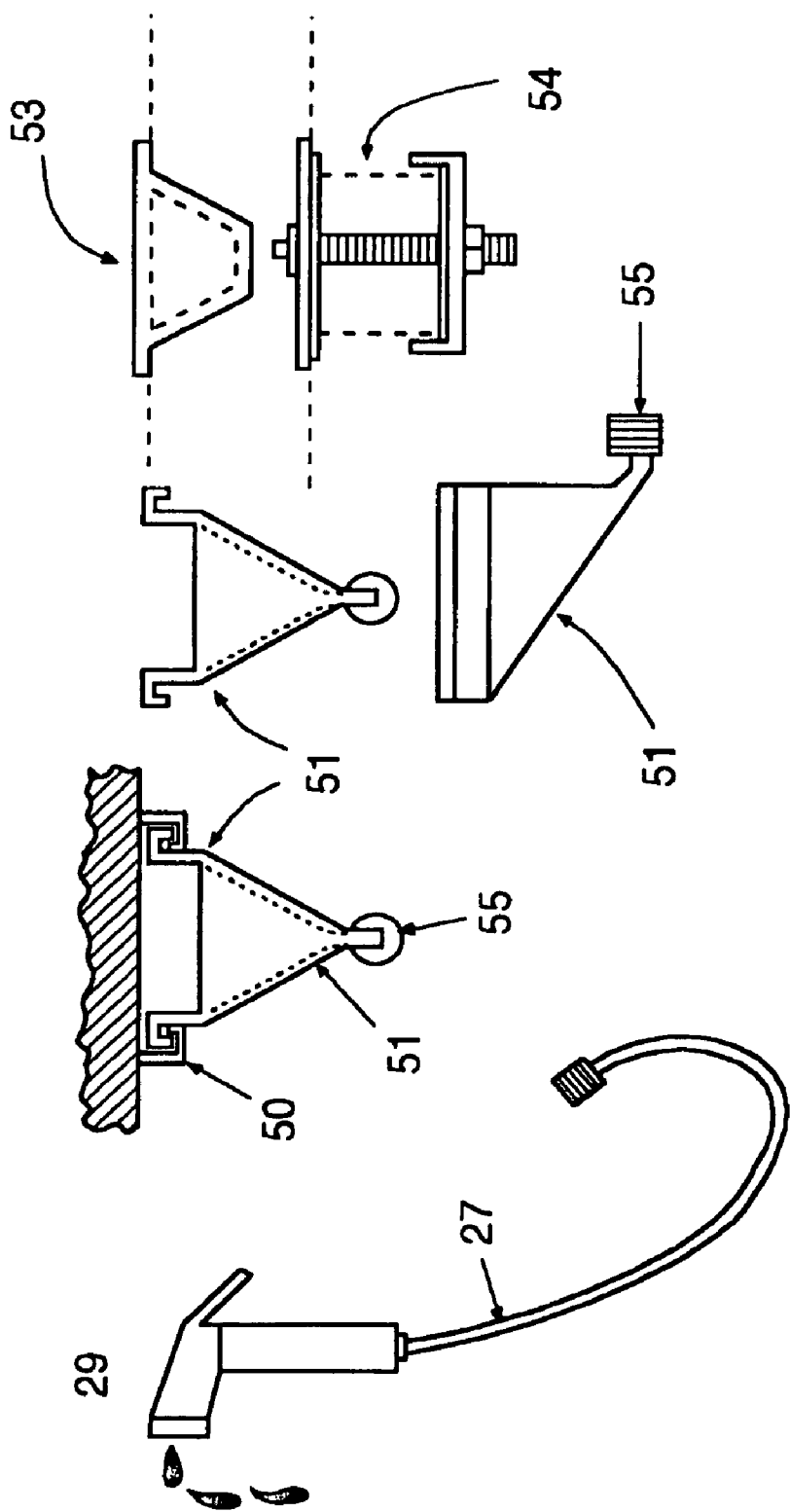
FIG. 11 shows various spray and funnel designs and plug.

Faucet assembly 24, shown in FIG. 7, preferably comprises a T-section 25 extending from section 18, which is adapted to engage spigot 26, on one end, and spray hose 27, on the other, as shown in FIG. 1. Both spigot 26 and hose 27 preferably have threaded ends such that they can be attached and detached from T-section 25 using threaded nuts 28, shown in FIGS. 7-8. A threaded end of spigot 26, for example, can be adapted to engage threaded nut 28 on one end of T-section 25, wherein by loosening threaded nut 28 on spigot 26, the spigot can be rotated up or down. When lid 3 is open, spigot 26 can be extended up vertically, but spigot 26 can also be rotated down to allow the lid 3 to be closed when desired. In this respect, threaded nut 28 can preferably be used to hold spigot 26 at various angles if desired. Spray hose 27 preferably has a spray nozzle 29 with a handle attached thereto as shown in FIG. 11. Spray nozzle 29 can be any conventional spray nozzle with a handle and handle-operated valve.

Figure 9:
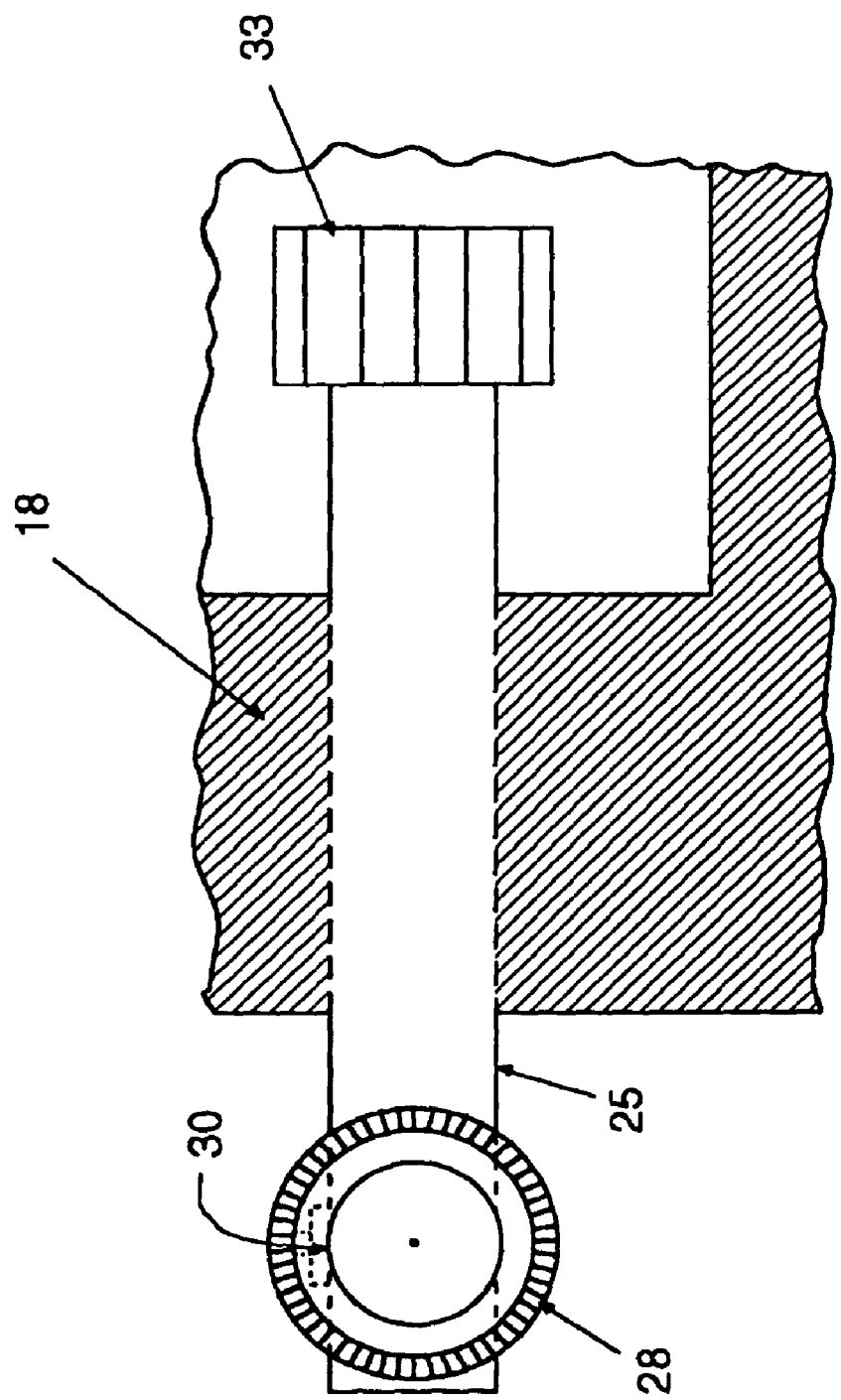
FIG. 9 is a section view of the t-section.

Within T-section 25 is preferably a valve 30, as shown in FIG. 9, which can be any conventional type. The valve 30 is preferably operatively associated with handle 31, shown in FIG. 7, on T-section 25, to control the supply of running water through spigot 26. Handle 31 operates valve 30 so that water under pressure can be released by turning handle 31 in the conventional manner. A valve is not required on the opposite side of T-section 25 since spray nozzle 29 preferably has its own valve.

Figure 3:
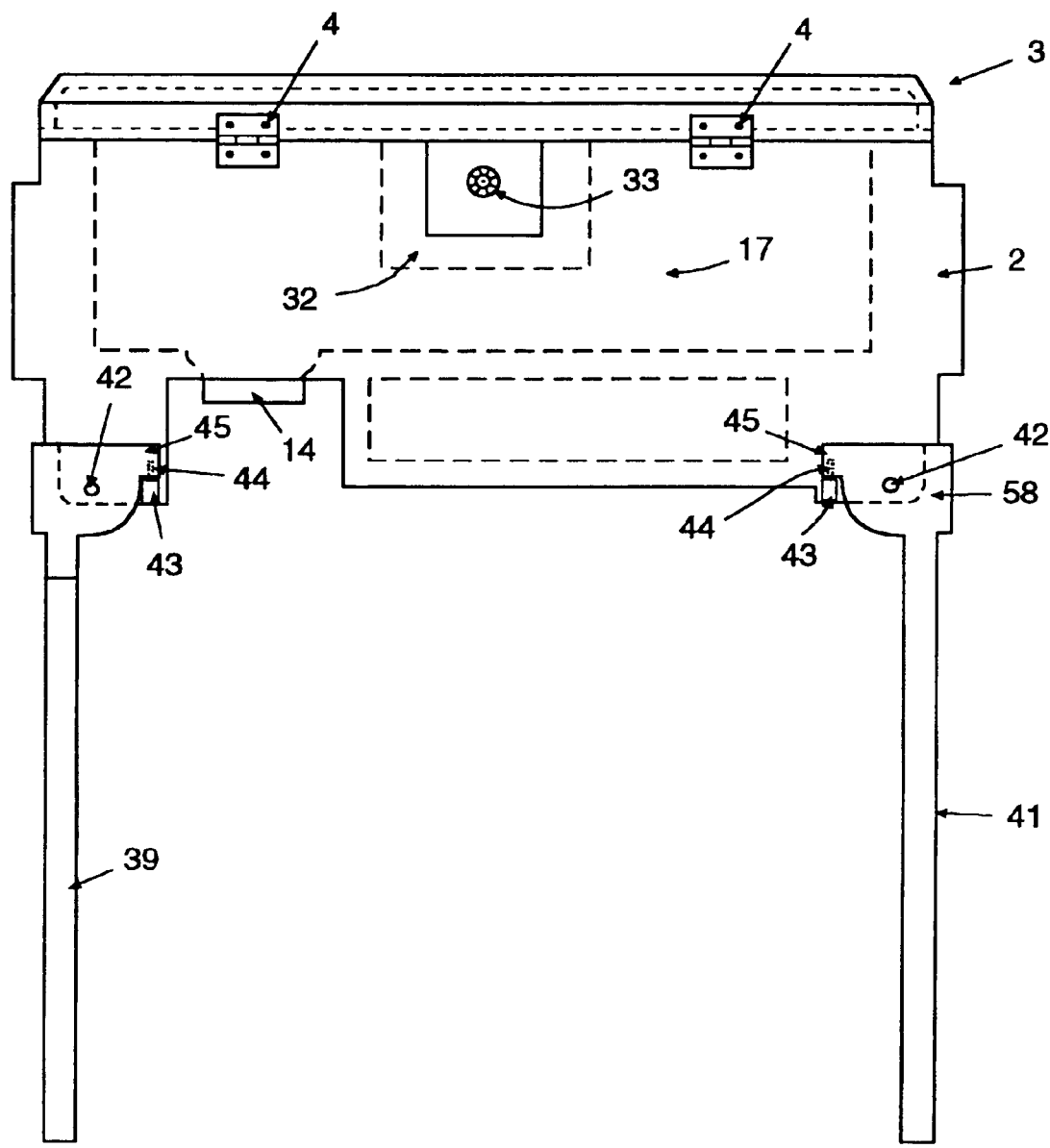
FIG. 3 is rear view of the present invention.
Figure 4:
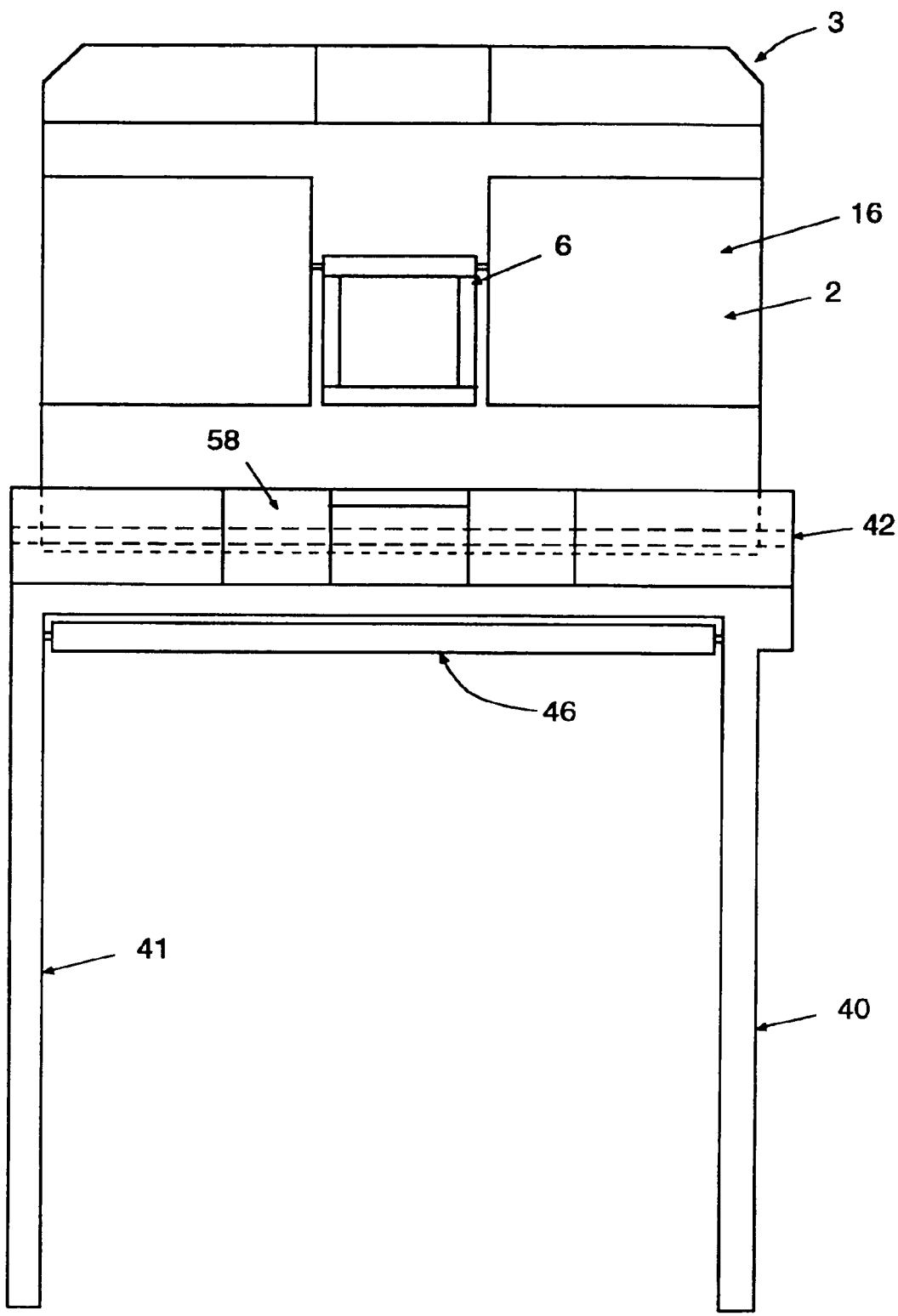
FIG. 4 is a side view of the present invention.

On the backside of section 18 and wall 17 is preferably an indentation area 32 with a hose connection 33, as shown in FIGS. 3 and 7. Indentation 32 keeps connection 33 from protruding out the back wall 17, which makes storing sink 1 easy. The hose connection 33 preferably comprises a pipe structure having an opening that extends through section 18 to communicate with T-section 25, as shown in FIG. 9. Hose connection 33 is preferably adapted to connect sink 1 to an existing water supply. It preferably comprises a nut with an internal thread into which the threaded end of a standard size hose (not shown) can be attached. In this respect, connection 33 can be any conventional type, which enables an externally threaded hose or pipe to be inserted and connected thereto. An adapter (not shown) to enable connection 33 to be used in connection with an internally threaded connector or different size pipe can also be provided.

Figure 10:
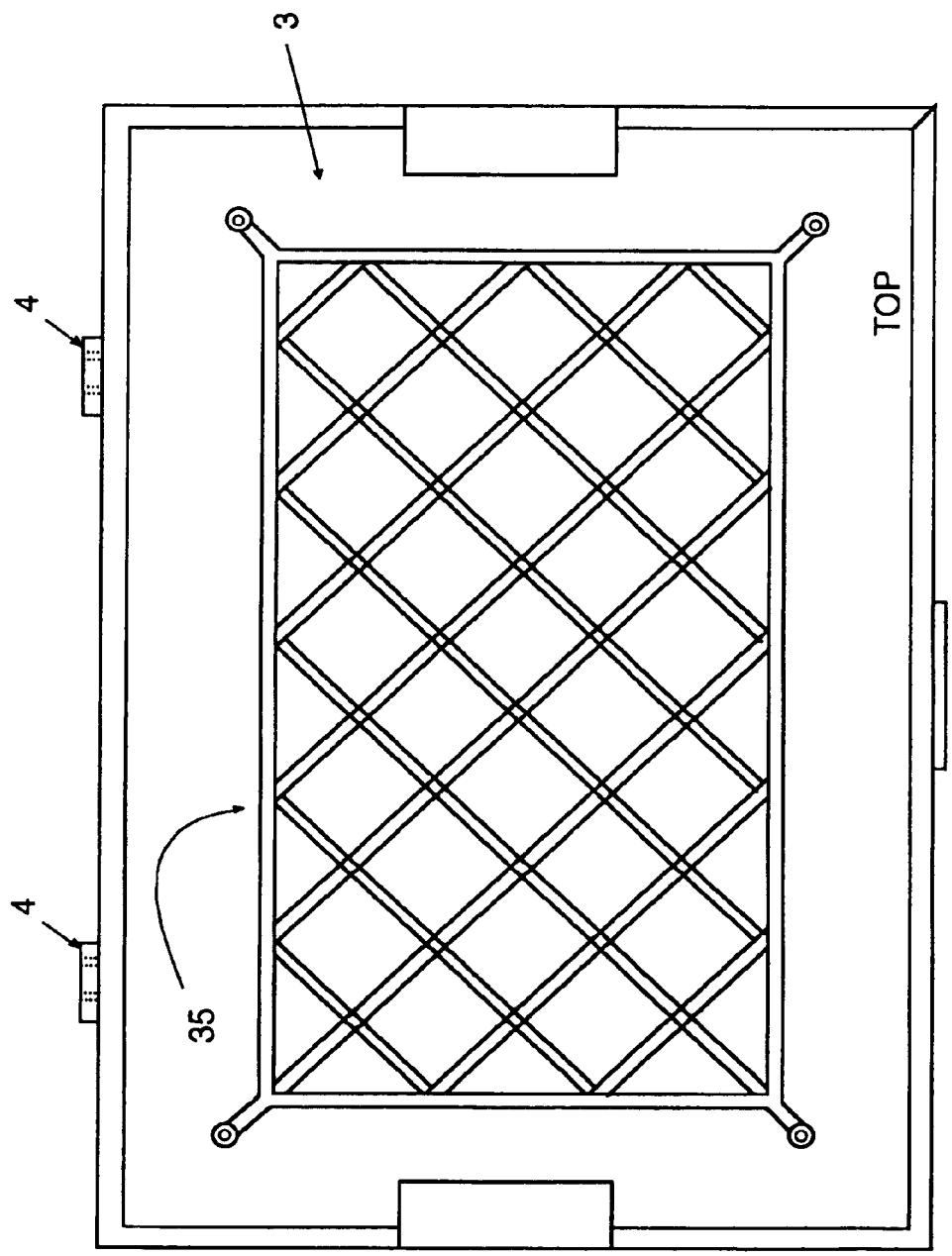
FIG. 10 a front view of the mesh embodiment of the lid.

The inside of lid 3 preferably has a shelf 34, as shown in FIG. 1, or basket (not shown), thereon. Shelf 34 is preferably secured to the inside of lid 3 such that when lid 3 is upright, shelf 34 is substantially horizontal. Openings 36 of various sizes are preferably provided on shelf 34 for holding utensils such as knives, toothbrushes, spoons, forks, etc. A hook 37 is also preferably provided for hanging spray nozzle 29. Stop cord 7 can also be secured to shelf 34 or directly to lid 3. An elastic mesh net 35, such as an elastic cargo net, as shown in FIG. 10, can also be provided on the outside of lid 3. Mesh 35 is preferably secured to lid 3 at its four corners and enables items such as towels, blankets, etc. to be stored therein.

Below sink body portion 2 are preferably legs 38, 39, 40 and 41. Each leg preferably extends from a hinge 42, which allows the legs to swing from a tucked position under sink portion 2, to an extended upright position, as shown in FIGS. 1 and 2. When extended, legs 38, 39, 40 and 41 can preferably be locked in their upright positions by locking mechanisms 43, comprising a pin 44 that mates with a spring tension latch 45, as shown in FIG. 2. Tension on latch 45 is preferably tight enough to support legs 38, 39, 40 and 41 in their upright positions, while loose enough to allow the legs to be easily pushed into their tucked positions, as shown in FIG. 6. Enough friction is preferably provided by hinges 42 to hold legs 38, 39, 40, 41 in their tucked positions.

Legs 38, 39, 40 and 41 are preferably offset (from one side to the other), as shown in FIG. 6, i.e., legs 38 and 39, which extend from the right side, are offset toward the front of sink portion 2, and legs 40 and 41, which extend from the left side, are offset toward the back of sink portion 2, such that all four legs can be swung up into the tucked position without overlapping each other (to be more compact). The legs can also be offset in the opposite direction. Crossbars 46 preferably extend between legs 8 and 39, and 40 and 41, respectively, and can preferably slide up and down along grooves 47 extending along a portion of the length of the legs as shown in FIG. 1. When moved up, the crossbars 46 are moved out of the way so that they advantageously allow the legs to fold up into the tucked positions. When the legs are swung down to their upright positions, the crossbars 46 can slide down to help support and provide rigidity to the legs. Legs 38, 39, on one side of sink portion 2 are preferably connected at the top by lateral member 58, and legs 40, 41, on the other side of sink portion 2, are likewise connected at the top by another lateral member 58 on the other side. Hinges 42 operate with friction to allow lateral members 58 to pivot, and therefore, legs 38, 39, 40, 41 can be swung up and down. Protruding knob 48, as shown in FIG. 1, can be provided on lateral member 58 to help enable the legs to be easily grasped and extended in the upright positions.

Figure 12:
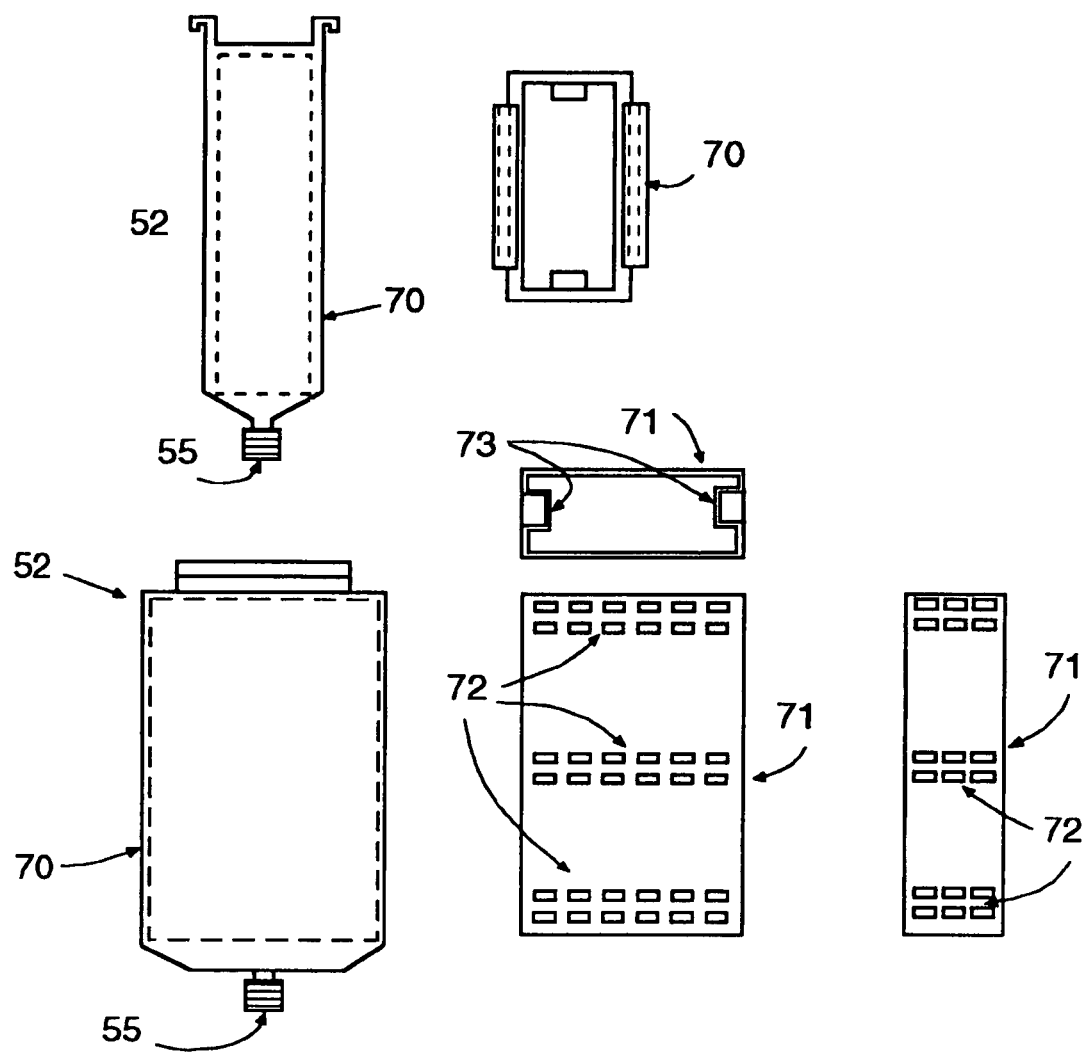
FIG. 12 shows a strainer funnel with outer housing.

Extending below floor 11 beneath drain 14 is preferably a funnel hanging assembly 50, as shown in FIG. 11. Drain 14 extends through floor 11 and preferably has an opening sufficient in size so that water and other debris such as fish and game parts can flow through and out, from the bottom of sink portion 2. Various funnel designs, 51 and 52, as shown in FIGS. 11 and 12, can preferably be supported by funnel assembly 50. Moreover, drain 14 can preferably be designed to enable a strainer to be hung down from the edge of the drain 14.

Assembly 50 preferably comprises support runners on the underside of the floor 11 of sink portion 2 on which funnels 51, 52, can slide. Funnel 51 preferably has a lower opening 55 through which water can be drained. The lower end of funnel 51 is preferably adapted to be connected to a hose, and lower opening 55 can be used to divert water from sink portion 2 in a predetermined direction, i.e., so that water and debris do not pour out onto the user's feet. Funnel 51 can also be angled as shown to help divert water in a specific direction, i.e., such as backwards away from the user's feet.

A strainer 53 as well as a plug 54, shown in FIG. 11, can also be used in association with drain 14. Strainer 53 can be any conventional type that fits on top and into drain 14 inside sink portion 2. Plug 54 can also be any conventional type, such as one that can fit above and below drain 14 to seal the opening therein. In this respect, the top piece of plug 54 is preferably adapted to seal the drain opening 14 on floor 11, and the bottom piece is adapted to be held together with a bolt that can be tightened from beneath sink portion 2. Plug 54 can be used to seal drain 14, such as when sink 1 is not in use, or when it is desirable to maintain water in sink portion 2. An additional smaller drain 57 can also be provided on sink portion 2, such as along side wall 16, as shown in FIG. 2. Drain 57 can be much like any conventional drain with a plug, such as those used on ice chests.

Funnel 52, shown in FIG. 12, can also be used with a strainer 71, to capture debris and allow water to flow through opening 55 from drain 14 of sink portion 2. Funnel 52 and strainer 71 can be used to remove debris during cleanup tasks, such as removing fish and game parts, etc., while allowing water to drain out. Funnel 52 preferably has an outer funnel portion 70, which has means for hanging funnel 52 from funnel assembly 50, and an inner strainer 71, which can be inserted into funnel 52 and supported by outer portion 70. Inner strainer 71 preferably has a plurality of holes or perforations 72 through which water can pass, but which are small enough to catch debris. The inner strainer 71 preferably is sized so that it can be easily fitted into outer portion 70 from above, and preferably has handles 73 for easy insertion and removal.

Figure 13:
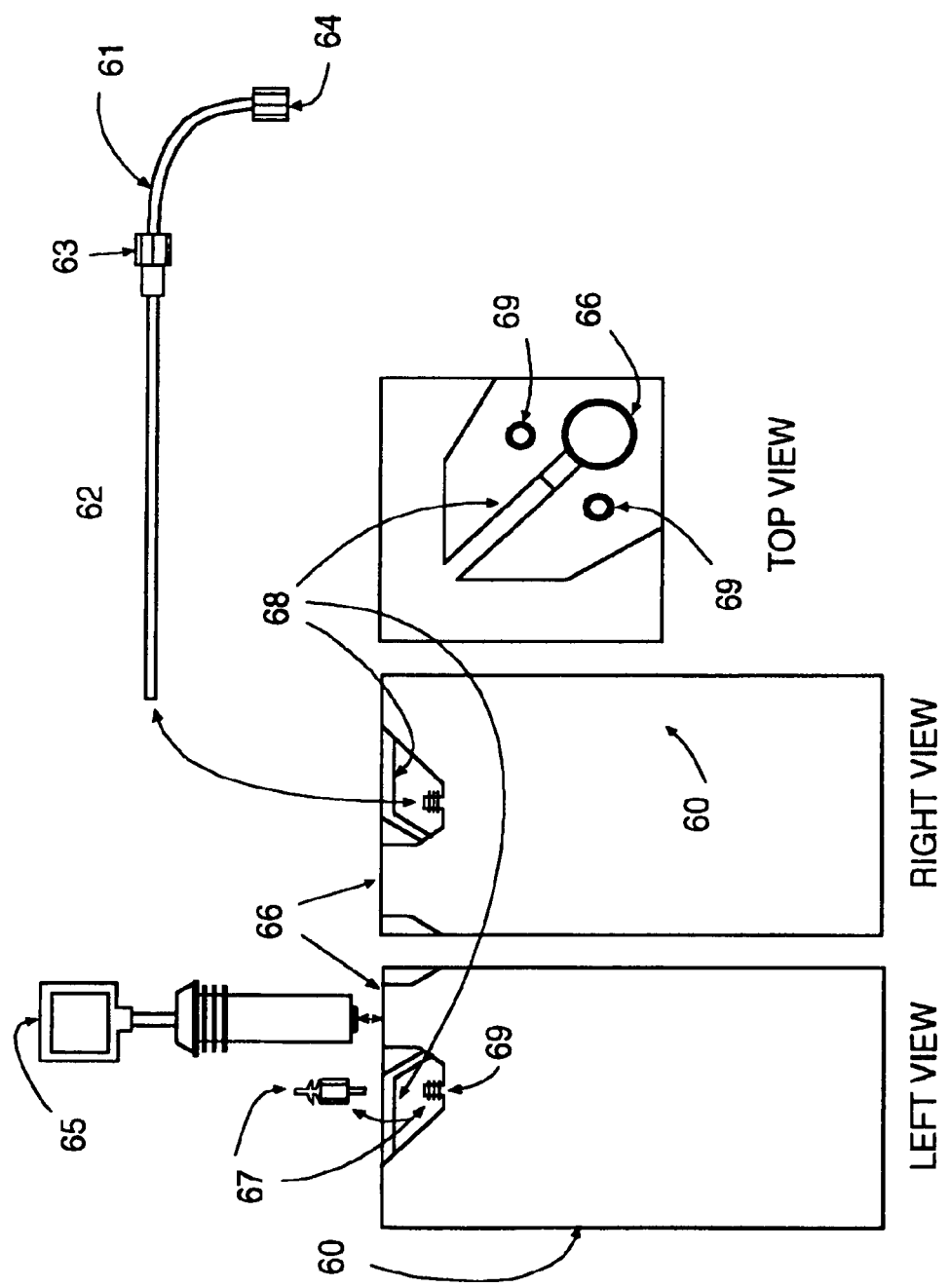
FIG. 13 shows a pressurized tank.

A portable water source, such as a pressurized tank 60, as shown in FIG. 13, can also be provided. Tank 60 can be sized and shaped so that it can be transported inside of sink portion 2, if desired, although preferably it is a standard tank. A water input spout 66 is preferably provided on the top, as well as two output openings 69. A hose 61 is preferably provided with a tube 62 (adapted to be fitted inside the tank) on one end, which has a threaded connector 63 adapted to be connected to one of the openings 69 on tank 60. On the other end of hose 61 is a second threaded connector 64 adapted to be connected to the hose connection 33 on sink portion 2 to supply water to sink 1. A hand operated pump 65, which is preferably adapted to be connected to input spout 66, can also be provided to add pressure into tank 60. A valve 67 can be provided on the other output opening 69 to release pressure when needed. A carrying handle 68 can also be provided for easy lifting.

Figure 14:
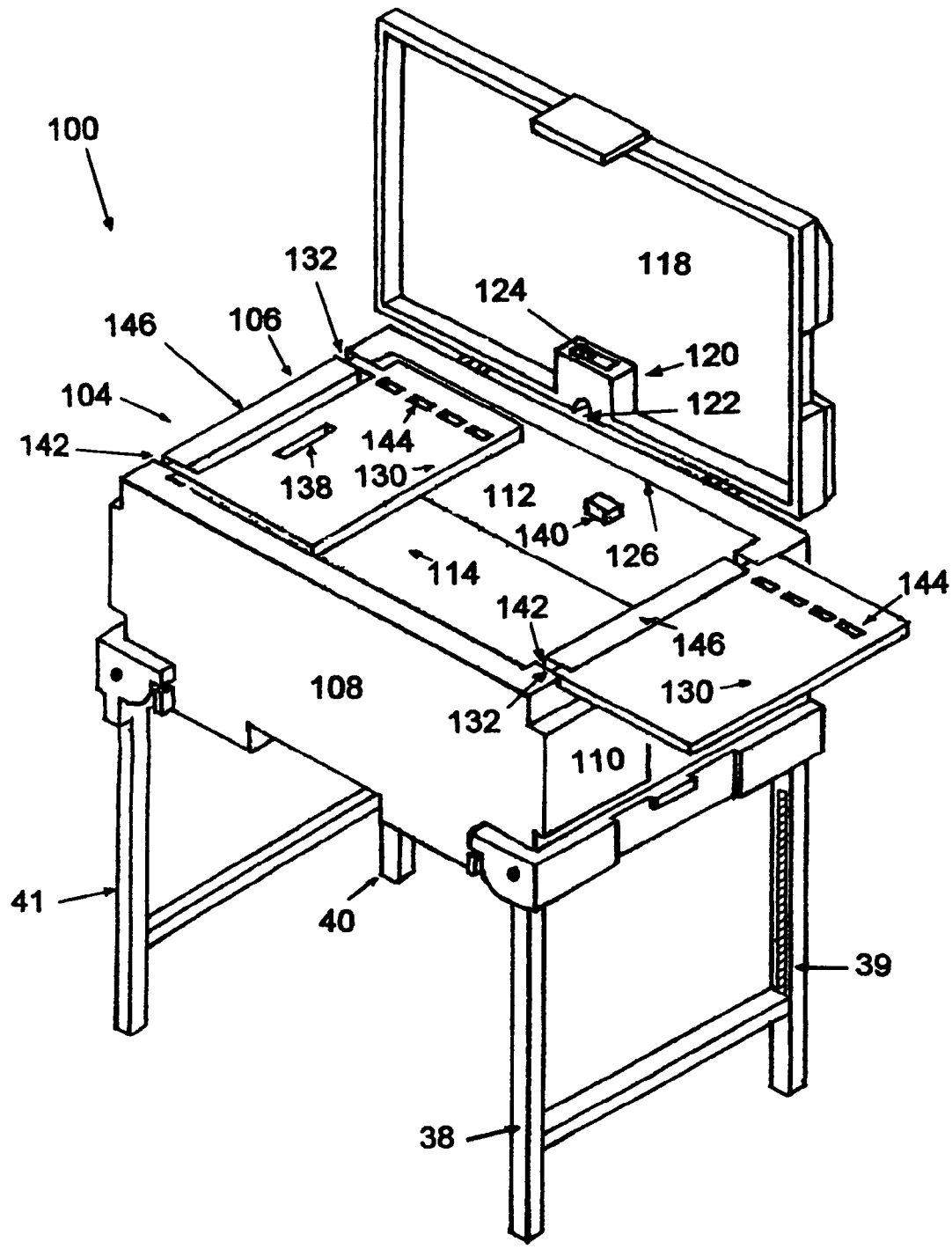
Figure 15:
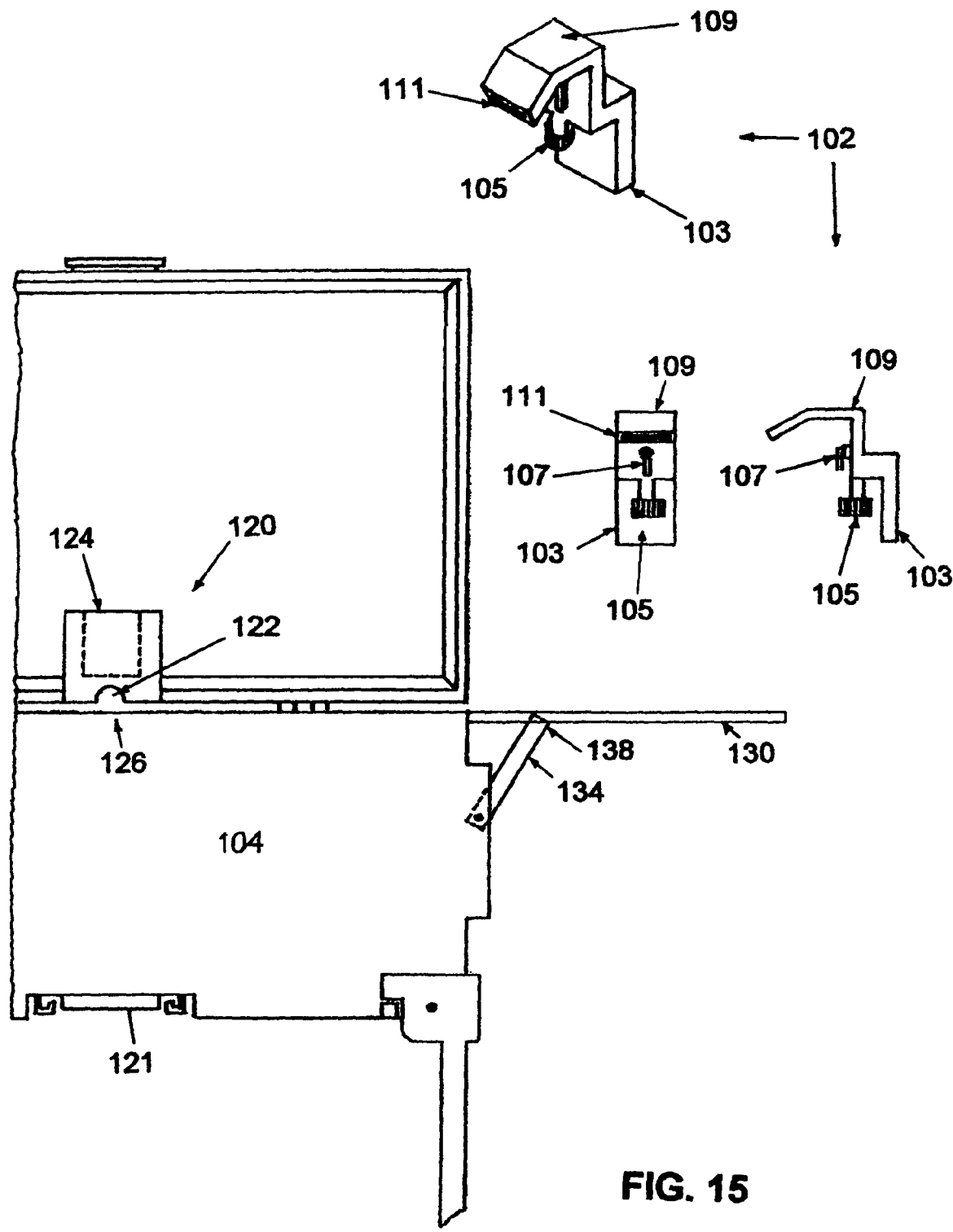

In the embodiment 100, shown in FIGS. 14 and 15, a simplified sink body portion 104 with a detachable modified faucet assembly 102 that is more economical to produce is shown. Sink portion 104 preferably has four sidewalls, 106, 108, 110 and 112, and a floor 114, and a hinged lid 118. It also preferably has legs 38, 39, 40, 41, although not necessarily so, handles 134, a drain 121, etc., and in this respect, is similar to previous sink portion 2. Sink portion 104, however, preferably does not have a built-in extension 18, nor a specific plumbing connection 33, such as faucet assembly 24 and spigot 26, etc., like those of the previous embodiment, although it can be adapted with such features. Instead, a modified faucet assembly 102, which can be attached and detached, is preferably provided.

Modified faucet assembly 102, as shown in FIG. 15, preferably has a lower insert portion 103, a threaded attachment section 105, a valve and lever 107 for adjusting the flow of water, an extension 109 and opening 111, through which water can flow. Attachment section 105 is preferably adapted with threads so that the threaded end of a conventional hose can be secured thereto, wherein water can then be supplied through the hose (not shown), via valve and lever 107, through extension 109 and opening 111, and into sink portion 104.

A support assembly 120, as shown in FIGS. 14 and 15, is preferably located on the inside of lid 118, for detachably supporting faucet assembly 102. Support assembly 120 preferably comprises a support cavity 124 into which lower insert portion 103 of modified faucet assembly 102 can be inserted and supported thereby. Any means of supporting faucet assembly 102, such as a post for inserting into a hole located on faucet assembly 102 (not shown), are contemplated. Support assembly 120 also preferably comprises an opening 122, which is preferably circular or semi-circular, extended through lid 118, through which the hose can be extended from behind lid 118. Although opening 122 is shown to be located on support assembly 120, it can be located anywhere that provides the desired results, as will be discussed.

When faucet assembly 102 is to be used, lid 118 is preferably opened to an upright position, as shown, which can be held by a chain, locked hinge or other conventional means as discussed previously. The hose can then be extended through opening 122, i.e., from behind lid 118, such that the hose is extended into sink portion 104. This way, the threaded end of the hose can be connected to attachment section 105 of faucet assembly 102, such that the hose can be connected to faucet assembly 102. Moreover, the lower insert portion 103 can be inserted into support cavity 124, such that faucet assembly 102 is supported thereby, wherein the end of the hose can be bent upward in engagement with attachment section 105 of faucet assembly 102. This way, the hose can be extended through opening 122 and attached to faucet assembly 102, wherein the faucet assembly 102 can be positioned on lid 118, where it an be used as a faucet, via valve and lever 107, to supply water into sink portion 104.

When faucet assembly 102 is not being used, it can be detached from support assembly 120 simply by lifting faucet assembly 102 out of support cavity 124. Then, the hose can be disconnected from attachment section 105, such that faucet assembly 102 can be removed and stored separately. Lid 118 can then be closed to seal sink portion 104 with no obstruction from support assembly 120, the hose or faucet assembly 102. In this respect, support assembly 120 and opening 122 are preferably located on lid 118 in a manner that allows lid 118 to be closed, with opening 122 oriented in a manner that provides access into sink portion 104. That is, opening 122 is preferably located on an edge portion of lid 118, that is capable of being closed against an upper edge 126 of wall 112, such that when lid 118 is closed, opening 122 will not allow access into sink portion 104, thereby allowing sink portion 104 to be substantially sealed by lid 118.

An advantage of this embodiment is that sink portion 104 can be made without any built-in plumbing connection. That is, it can be made like a standard sink basin, or, it can be made like a portable ice chest or container, such as with double-wall construction, so that it can double as an ice chest. When made like an ice chest, the present invention contemplates that sink portion 104 can be made with a relatively large drain sufficient for allowing fish and game parts to be pushed through. In this embodiment, the construction of sink portion 104 does not necessarily require the other features discussed in relation to the previous embodiment, although they can be provided if desired.

This embodiment is also shown with optional fold-down utility panels 130, one on each end of sink portion 104. Each panel 130 is preferably connected by hinges 132 that are built into walls 106, 110, such that panels 130 can be pivoted from a closed position, as shown on the left hand side of FIG. 14, wherein panels 130 are positioned inward over sink portion 104, and an opened position, as shown on the right hand side of FIG. 14, wherein panels 130 are swung and extended outward as shown. Handles 134, shown in FIG. 15, are preferably provided on walls 106 and 110 to support panels 130. That is, handles 134 are preferably made so that they can be swung up and wedged into cut-outs or notches 138 located on the underside of panel 130, as shown in FIG. 15. The cut-outs or notches 138 are preferably adapted and located on panels 130, based on the size and configuration of handles 134, such that panels 130 can be held substantially horizontally by handles 134 when in the opened position. Supports 140 can be extended on sink portion 104 to support panels 130 in the closed position.

Openings 144 for supporting utensils and the like can be provided on panels 130. Hinges 132 are preferably constructed to fit into openings 142 along an upper edge 146 of walls 106, 110, so that when lid 118 is closed, sink portion 104 can be substantially sealed thereby.

The embodiment 200, shown in FIGS. 16-18, comprises a container 202, with hinges 203 supporting a pivoting lid 204. Lid 204, which, in FIG. 16, is shown in an upright position, is capable of being closed, to seal container 202. In this embodiment, two fold-out utility panels 206, 208, on hinges 218, are preferably provided. Each panel preferably pivots between opened and closed positions, as shown in FIG. 16, i.e., panel 206 is shown in the opened position, and panel 208 is shown in the closed position. Panels 206, 208 can be made similar to a cutting board, and have openings 207 for holding utensils, such as knives, etc., as previously discussed.

In the closed position, as shown in FIG. 18, panels 206, 208 are preferably able to be positioned substantially horizontally, along an upper portion 210, of container 202. This way, lid 204 can be closed, with panels 206, 208 inside container 202. Preferably, at least one ledge 212 is provided on the inside of container 202, extended on either side of each panel, to support panels 206, 208 in the closed position. In the preferred embodiment, two ledges 212 are preferably provided on opposing sidewalls, along upper portion 210. Each ledge 212 preferably has a stepped portion that extends below an upper edge 214, such that in the closed position, panels 206, 208 can lie substantially flush with upper edge 214, as shown in FIG. 18. When panels 206, 208 are closed, they can provide additional work areas for performing work on container 202.

Figure 21:
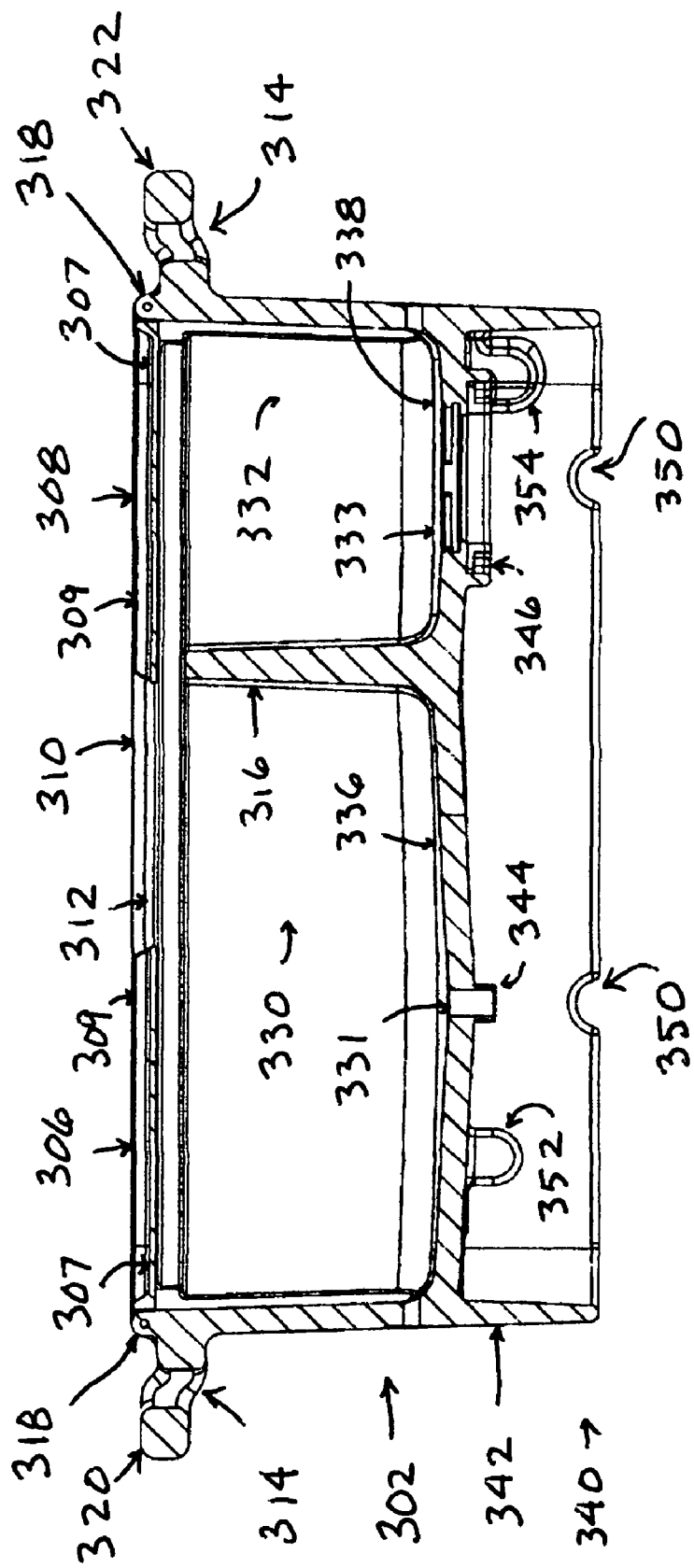
Figure 22:
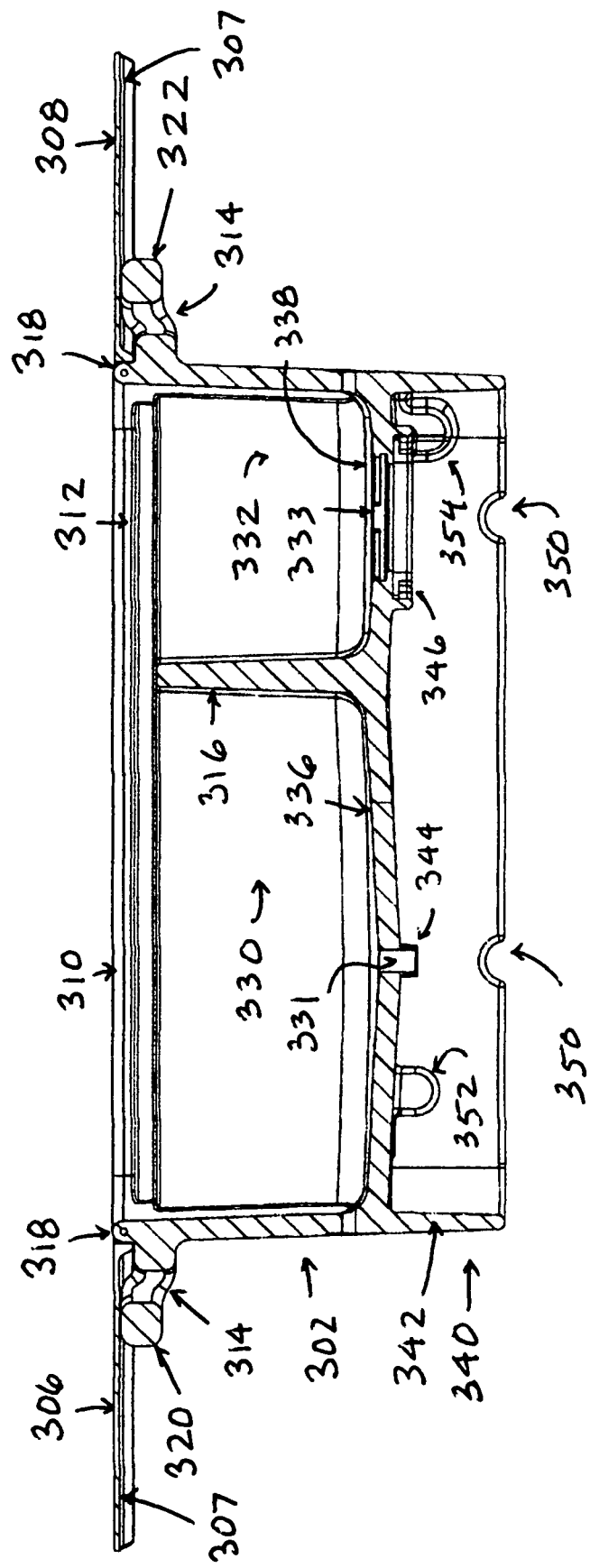

One or more dividers 216 can be provided inside container 202. Dividers 216 preferably divide container 202 into multiple compartments, such as one compartment with a drain, and one without, or one compartment with a small drain, and the other with a large drain, etc., as shown in FIGS. 21 and 22. Preferably, divider 216 has an upper edge 217 extended below or at the same height as ledge 212, such that panels 206, 208 can lie substantially flush with upper edge 214, without interference from divider 216. It can be seen that even without ledges 212, divider 216 can be adapted such that panels 206, 208 will rest on and be supported by divider 216, as an alternate means of supporting panels 206, 208 in the closed position.

Each panel 206, 208 is preferably provided with two hinges 218 that are adapted and configured so that lid 204 can be closed and sealed against upper edge 214, without interference from panels 206, 208, or hinges 218, whether panels 206, 208 are opened or closed. In this respect, hinges 218 are preferably adapted and configured to fit into openings extended along upper edge 214, wherein the fit is preferably substantially tight, such that lid 204 can be substantially closed and sealed on container 202. Alternatively, hinges 218 can be made using a removable pin, such that panels 206, 208 can be removable.

In the opened position, as shown in FIG. 17, panels 206, 208 are preferably supported by fixed handles 220, 222, shown in FIG. 18, extending from opposite ends of container 202. Handles 220, 222 are preferably adapted so that panels 206, 208 can be supported substantially horizontally when the panels are in their opened position, so that they can be used as additional utility surfaces, i.e., for cutting, cleaning, etc. Handles 220, 222 preferably each have a stepped portion 224, such as on or near upper edge 214, that enables panels 206, 208 to be substantially flush with upper edge 214, as shown in FIG. 17. Again, this allows lid 204 to be closed and substantially sealed, with panels 206, 208 in their opened position, without interference from panels 206, 208.

This embodiment 200 can be an ice chest or similar device, such as with double-wall construction. It can also be provided with a spigot or faucet assembly (permanent or detachable), such as those discussed previously. In such case, container 202 can be a portable sink, i.e., to enable water to be supplied into container 202. It can also be provided with other features discussed above, including without limitation, drains, legs, hanging assemblies, funnels, strainers, an opening on the lid, water tank, shelves, etc. It can also be made with pivoting handles, such as those discussed above, in connection with the embodiment shown in FIGS. 14-15.

Figure 19:
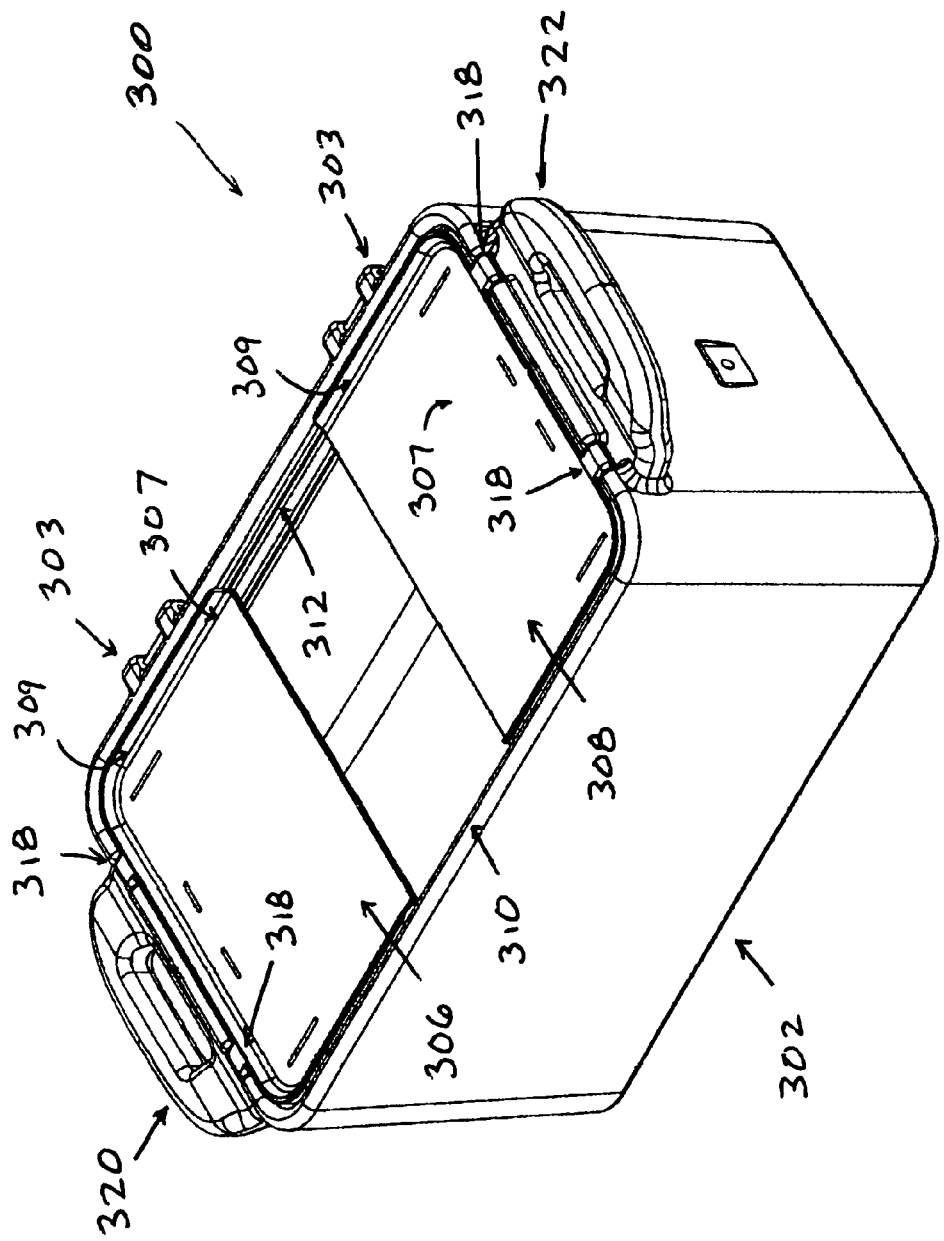
FIGS. 19 to 22 show a second container embodiment with hinged/recessed utility panels and modified fixed handles to support the panels.
Figure 20:
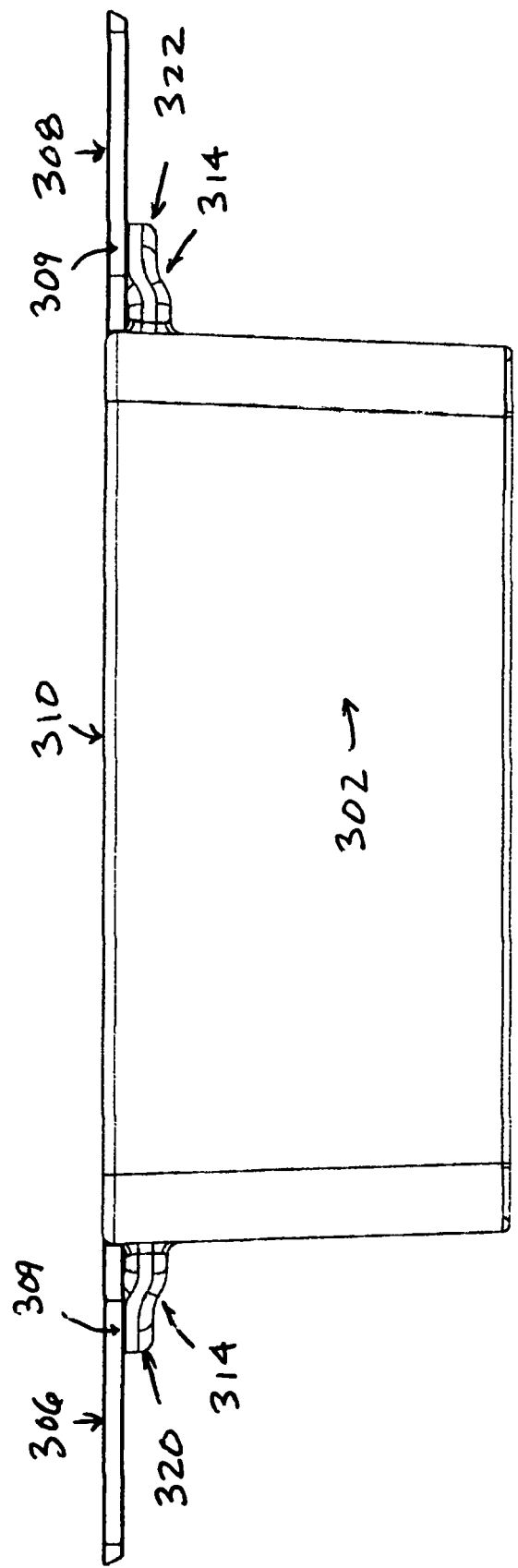

A similar embodiment 300, is shown in FIGS. 19-22. This can also be an ice chest, portable sink, or similar device, with a container 302, and hinges 303 supporting a pivoting lid (not shown). Like the previous embodiment, this embodiment preferably has two fold-out utility panels 306, 308, on hinges 318, which are supported in a similar manner. Each panel 306, 308 preferably pivots between opened and closed positions, i.e., FIG. 19 shows panels 306, 308 in the closed position, and FIG. 20 shows panels 306, 308 in the opened position.

In their closed position, as shown in FIG. 19, panels 306, 308 are preferably supported by ledges 312, which enable panels 306, 308 to lie substantially horizontally flush along an upper portion 310 of container 302. In the opened position, as shown in FIG. 20, panels 306, 308 are preferably supported substantially horizontally, by fixed handles 320, 322, extending outward from the ends of container 302. Container 302, including hinges 318, preferably enable the lid to be closed and sealed, with panels 306, 308 in either opened or closed positions, in much the same manner as container 202, with lid 204, hinges 218, and panels 206, 208.

In this embodiment, panels 306, 308 preferably have a recessed surface 307, i.e., on the side facing up when panels 306, 308 are in their closed position, as shown in FIG. 19. Each panel 306, 308 preferably has retaining walls 309 extended on three sides thereof, wherein water can be diverted from recessed surface 307 and into container 302. For example, in the closed position, as shown in FIG. 19, panels 306, 308 are preferably positioned substantially horizontally on container 302, and water on panels 306, 308 can be diverted toward the center of container 302, instead of off edges of container 302.

Due to recessed surface 307, handles 320, 322 are preferably provided with an upward extension 314, as shown in FIGS. 20-22. This extension 314 enables handles 320, 322 to engage and support panels 306, 308, such that they extend substantially horizontally in the opened position, as shown in FIGS. 20 and 22, notwithstanding recessed surface 307. Extension 314 extends up into the area formed by recessed surface 307, to engage the recessed surface 307 of panels 306, 308, as shown in FIG. 22.

Container 302 preferably has multiple compartments, such as compartments 330, 332 shown in FIGS. 21 and 22, separated by a divider 316. Each compartment 330, 332 can be the same size, or they can be different sizes. In this embodiment, compartment 330 is larger than compartment 332. A drain 331, 333, is preferably provided on each compartment 330, 332, respectively, to allow water to drain out. The floor of container 302, such as floors 336 and 338, can be sloped toward drains 331, 333, respectively, to improve water flow into drains 331 and 333.

A lower section 340 of container 302 preferably has a skirt 342 to support container 302 and elevate floors 336, 338 above a supporting surface, such as a table. Skirt 342 preferably comprises vertical downward sidewall extensions, extending below floors 336, 338, to provide clearance under container 302. This way, hoses and other attachments can be connected to the underside of container 302, such as onto drains 331, 333, even when no legs are used, i.e., when container 302 is placed on a table or on the ground.

For example, drain 331 can be provided with a threaded fixture 344 extending down, as shown in FIGS. 21 and 22, which enables a hose (not shown) to be attached thereto, for directing the flow of water away from the user. A threaded cap (not shown), in such case, can be provided that can be fastened onto the bottom of fixture 344, to seal drain 331, if desired, or a plug can be provided.

Under floor 338 and compartment 332, drain 333 can be provided with a hanging assembly 346, such as those described above, on which a funnel, strainer, basket, etc., for catching debris, can be attached. Preferably, drain 333 is relatively large to enable debris to pass through, as discussed above. A hose can be used in connection with the funnel, strainer, basket, etc., to enable water to be diverted away from the user.

Various means of plugging drains 331, 333, in addition to threaded caps, can be provided, including resilient plugs, seals, etc. A "plug flange," for example, can be provided, such as on larger drain 333, with a terminating threaded end, which can be screwed into drain 333, through floor 338, i.e., from the inside of container 302. In such case, a hose can be attached to the plug flange, or a threaded cap can be provided, to seal drain 333. The bottom edge of skirt 342 preferably has at least one cut-out or opening 350 to enable a hose to pass through underneath skirt 342. FIGS. 21 and 22 show leg fasteners 352, 354, on which legs can be pivotally mounted.

The main components of the present invention are preferably made of materials similar to those used to construct ice boxes and ice chests, such as plastic, aluminum, metal, etc. In one embodiment of the present invention, the pieces can be made of materials that have insulation properties, and/or double-wall construction, with foam or other insulation inside. In this way, the present invention can double as an ice chest. This can be useful on fishing and hunting trips, wherein fish and game parts can be cleaned in the sink portion or container, and then stored with ice inside, wherein the lid can be used to close and seal the sink portion or container for easy transport home.

The other components of the present invention can be made of any conventional material. For example, the legs, handles, drawers, shelves, latches, funnels, panels, strainers, support assemblies, faucet assemblies, etc. can be made of plastic, or other moldable material, or from the same materials used to make the sink portion, container and/or lid. Any conventional materials can also be used to make items such as the connections, hoses, spigots, tanks, pumps, tubes, valves, liners, spray nozzles, meshes, baskets, cutting boards, cords, chains, plugs, hinges, nuts, handles, pins, latches, faucet assemblies, levers, threads, attachments, etc.

In use, the present invention can be set up on a table, such as with the legs tucked up, or when no legs are provided, directly on the table or ground, or on the ground elevated with the legs extended, so that the sink portion or container can be raised to about the same height as a standard counter top.

In the embodiment of FIG. 1, when extending legs 38, 39, 40, 41, tension between latch 45 and pin 44 can help maintain the legs in the upright position. Crossbars 46 can slide down to help support legs 38, 39, 40, 41. Latch 5 can also be unhooked to open lid 3 to an upright position and limited by stop 7. Spigot 26 can be rotated up or down by loosening and tightening nut 28. Connection 33 can be used to connect sink portion 2 to an existing water supply such as a garden hose. In this respect, a separate hose can be carried in sink portion 2 so that it can be used to connect sink 1 to an outdoor water faucet when desired. Tank 60 can also be carried inside sink 1 and used where no existing water supply is available.

With sink 1 connected to a water supply, handle 31 can control valve 30 and be used to run water through spigot 26. Spray nozzle 29 can also be used to spray water through hose 27. Cutting boards 20 or basket 21 can be positioned on ledges 19 as discussed. Shelf 34 can be used to hold utensils, such as knives, forks, etc., as well as spray nozzle 29. Elastic mesh 35 can be used, such as during transport, for storing blankets, towels, etc. Drawer 9 is available to store items such as cutting boards 20, basket 21, utensils, etc. The cutting boards 20 are preferably sized so that they can be placed in drawer 9.

Funnels 51, 52, strainer 71, 53 and plug 54 can be used as needed. Funnels 51, 52 can be used with a second hose to divert water away from the user. Funnel 52 and strainer 71 can be used to strain debris from water flowing out of sink 2, while strainer 53 can be used in drain 14 to strain smaller particles.

Plug 54 can be used to seal drain 14. Smaller drain and plug 57 can be used as an auxiliary means of draining water without removing plug 54.

When done, crossbars 46 can be raised and legs 38, 39, 40, 41 can be tucked up into the tucked position and held by friction with hinges 42. Spigot 26 can be moved back to a lower position. Spray nozzle 29 can be removed and stored in sink portion 2. The hose can be disconnected from connection 33 and placed inside the sink 1. All utensils, funnels, boards, baskets, etc., can be stored in sink 1 or drawer 9. Lid 3 can be closed with latch 5. Handles 6 can be used to carry sink 1.

In the embodiment of FIGS. 14-15, with lid 118 in an upright position, the hose is extended through opening 122, i.e., from behind lid 118. The threaded end of the hose is then connected to attachment section 105 of faucet assembly 102. Then, lower insert portion 103 is inserted into support cavity 124, such that faucet assembly 102 is supported on lid 118 above sink portion 104. This way, the hose is extended through opening 122 and attached to faucet assembly 102, wherein faucet assembly 102 can supply water into sink portion 104.

Moreover, panels 130 can be pivoted from the closed position to the opened position, and vice verse. In the closed position, panels 130 can rest on supports 140. To open, handles 134 are preferably raised, and panels 130 are opened and positioned over handles 134, until handles 134 are inserted into cut-outs or notches 138. Cut-outs or notches 138 and handles 134 are preferably adapted so that in the opened position, panels 130 are extended substantially horizontally outward from walls 106 and 110. To close panels 130, they are simply lifted up from the handles 134, and pivoted back onto supports 140.

When finished, faucet assembly 102 is detached from support assembly 120 simply by lifting faucet assembly 102 out of support cavity 124. Then, the hose is disconnected from attachment section 105, and faucet assembly 102 is removed and stored. Lid 118 can then be closed to seal sink portion 104, wherein there is no obstruction from support assembly 120, or faucet assembly 102. Also, opening 122 is oriented in a manner that causes it to be on the outside of lid 118 when lid 118 is closed, such that no access into sink portion 104 is provided, and sink portion 104 can be substantially sealed by lid 118.

In the embodiment of FIGS. 16-18, panels 206, 208 can be pivoted from the closed position, to the opened position, and vice verse. In the closed position, panels 206, 208 can rest on ledges 212, and lie substantially flush with upper edge 214. In the opened position, panels 206, 208 preferably rest on and are supported by handles 220, 222, wherein the panels can be supported substantially horizontally and extended from the ends of container 202. In either case, lid 204 can preferably be closed and sealed on container 202, without panels 206, 208, or hinges 218, interfering. Fixed handles 220, 222 are designed to avoid the need for pivoting and wedging the handles, as in the case of handles 134 in the previous embodiment, and for cut-outs or notches 138, which makes this embodiment easier to use.

In the embodiment of FIGS. 19-22, panels 306, 308 can similarly be pivoted from the closed position, to the opened position, and vice verse. When closed, panels 306, 308 can rest on ledges 312, and lie substantially flush with upper portion 310. Because panels 306, 308 have a recessed surface 307, with retaining walls 309, water on panels 306, 308 will be diverted into container 302, rather than flow off edges. When opened, panels 306, 308 are preferably supported by handles 320, 322, and can be extended substantially horizontally from the ends of container 302. In either case, the lid of container 302 can preferably be closed and sealed, without panels 306, 308, or hinges 318, interfering. Fixed handles 320, 322 are preferably designed with extensions 314, which extend up into the area formed by recessed surface 307, to engage recessed surface 307 and maintain panels 306, 308 in a substantially horizontal position.

The present invention has been described in terms of the embodiments described above. While an embodiment may have all of the features that have been described, the present invention contemplates that other embodiments having fewer than all of the features described above would still be within the scope of the present invention. In this respect, the present invention is intended to incorporate one or more of the features described above, as defined by the claims that follow.

What is claimed is:

1. A method of forming a portable sink that can double as an ice chest, comprising:

forming a sink body portion having two side walls, two end walls and a lower floor with a drain, wherein said two side walls and said two end walls have an upper edge that extends along an upper portion of said body portion;

pivotally connecting a lid along an upper edge of one of said two side walls, wherein said lid pivots from a closed position, in which said lid substantially covers a space inside said sink body portion, to an open position, and vice verse;

pivotally connecting two panels along an upper edge of each of said two end walls, wherein said panels pivot from a closed position, to an open position, and vice verse;

wherein with said panels in said closed position said panels are positioned above said space, and with said lid in said closed position said lid is positioned over said panels; and fixing a handle to each of said two end walls, wherein an uppermost surface of each of said handles is located a predetermined height from said upper edge of said end walls wherein with said panels in said open position, said panels are supported by said handles and extended substantially horizontally outward from said sink body portion.

2. The method of claim 1, wherein said panels have a predetermined thickness and wherein fixing said handles comprises making said predetermined height equivalent to one predetermined thickness below the height of said upper edge of said two end walls.

3. The method of claim 2, wherein said sink body portion has at least one ledge or divider that extends along a height that is equivalent to one predetermined thickness below said height of said upper edge of said walls.

4. The method of claim 1, wherein said panels have first and second surfaces and wherein said second surface has a recess portion and perimeter portion, wherein said recess portion has a first predetermined thickness, and said perimeter portion has a second predetermined thickness, wherein fixing said handles comprises making said predetermined height equivalent to one first predetermined thickness below the height of said upper edge.

5. The method of claim 4, wherein said sink body portion has at least one ledge or divider that extends along a height that is equivalent to one second predetermined thickness below said height of said upper edge of said walls.

6. A portable sink that can double as an ice chest, comprising:

a sink body portion having an interior space surrounded by two side walls, two end walls and a lower floor with a drain, wherein said body portion has an upper edge extending along an upper portion of said two side walls and said two end walls;

a lid pivotally connected to an upper portion of one of said two side walls, wherein said lid pivots from a closed position, in which said lid substantially covers said space, to an open position, and vice verse;

two panels pivotally connected to an upper portion of said two end walls, wherein said panels pivot from a closed position, to an open position, and vice verse, wherein with said panels in said closed position said panels are positioned over said space, and with said lid in said closed position, said lid is positioned over said panels; and a fixed handle extending from each of said two end walls, wherein an upper surface of each of said handles is located at a predetermined height relative to said upper edge wherein with said panels extended in said open position, said panels are supported by said handles and extended substantially horizontally outward from said sink body portion.

7. The sink of claim 6, wherein said panels have a predetermined thickness and wherein said predetermined height of said handles is equivalent to one predetermined thickness below the height of said upper edge.

8. The sink of claim 7, wherein said sink body portion has along the inside thereof at least one ledge or divider that extends along a height that is equivalent to one predetermined thickness below the height of said upper edge.

9. The method of claim 6, wherein said panels have first and second surfaces and wherein said second surface has a recess portion therein and a perimeter portion thereon, wherein said recess portion has a first predetermined thickness, and said perimeter portion has a second predetermined thickness, wherein said predetermined height is equivalent to one first predetermined thickness below the height of said upper edge.

10. A method of using a portable sink that can double as an ice chest, comprising:

opening and closing a lid pivotally connected along an upper edge of a sink body portion having walls and a lower floor with a drain, wherein said lid pivots from a closed position, in which said lid substantially covers a space inside said sink body portion, to an open position, and vice verse;

swinging two panels pivotally connected along said upper edge from a closed position, to an open position, and vice verse, wherein with said panels in said closed position, said panels are positioned over said space, and with said lid in said closed position, said lid is positioned over said panels; and supporting said panels in said open position with handles extending from said sink body portion, wherein said handles are fixed at a predetermined height relative to the height of said upper edge, wherein with said panels in said open position, said panels are extended substantially horizontally outward from said sink body portion.

11. The method of claim 10, wherein said panels have a predetermined thickness and swinging said panels into said open position comprises allowing said panels to rest on said handles substantially horizontally.

12. The method of claim 11, wherein said sink body portion has at least one ledge or divider that extends along a height that is equivalent to one predetermined thickness below said height of said upper edge, and swinging said panels into said closed position on top of said ledge or divider and positioning them substantially flush with said upper edge.

13. The method of claim 10, wherein said panels have first and second surfaces and wherein said second surface has a recess portion therein and a perimeter portion thereon, wherein said recess portion has a first predetermined thickness, and said perimeter portion has a second predetermined thickness, and wherein swinging said panels into said open position comprises allowing said recess portion to rest on top of said handles.

14. The method of claim 13, wherein said predetermined height of said handles is equivalent to one first predetermined thickness below said height of said upper edge.

15. The method of claim 14, wherein said sink body portion has along the inside thereof at least one ledge or divider that extends along a height that is equivalent to one second predetermined thickness below said height of said upper edge, and swinging said panels into said closed position comprises positioning them substantially flush with said upper edge.

16. The method of claim 1, wherein said sink body portion comprises at least one feature taken from the group consisting of:

1) a ledge or divider inside said body portion for supporting said panels;
2) a faucet assembly secured to or capable of being secured to said lid;
3) an opening on said lid through which a hose can be extended into said body portion when said lid is in said open position, wherein with said lid in said closed position, the hose is prevented from extending into said body portion;
4) a support assembly provided on the inside of said lid for supporting a detachable faucet assembly to be located at the end of a hose;
5) a stop connected to said body portion for limiting the opening movement of said lid to about perpendicular to said closed position;
6) multiple legs for supporting said portable sink in an upright position;
7) a hanging assembly provided under said floor of said body portion, said hanging assembly being adapted to support one or more auxiliary items thereon;
8) a hanging assembly provided under said floor of said body portion, said hanging assembly being adapted to support one or more funnels or strainers capable of having a second hose connected thereto for directing water flowing out of said drain in a predetermined direction;
9) multiple legs for supporting said body portion in an upright position, wherein said legs are hinged so that they can be moved between an upward tucked position, and a lower extended position;
10) multiple compartments separated by at least one divider;
11) multiple compartments separated by at least one divider, wherein each compartment is provided with its own drain;
12) a skirt extending down from said body portion to enable said floor of said body portion to be elevated such that connections can be made on the underside of said body portion; and
13) a skirt extending down from said body portion to enable said floor of said body portion to be elevated such that connections can be made on the underside of said body portion, wherein at least one cut-out or opening is provided in said skirt to enable a hose to pass through.

17. The sink of claim 6, wherein said sink body portion comprises at least one feature taken from the group consisting of:

1) a ledge or divider inside said body portion for supporting said panels;
2) a faucet assembly secured to or capable of being secured to said lid;
3) an opening on said lid through which a hose can be extended into said body portion when said lid is in said open position, wherein with said lid in said closed position, the hose is prevented from extending into said body portion;
4) a support assembly provided on the inside of said lid for supporting a detachable faucet assembly to be located at the end of a hose;
5) a stop connected to said body portion for limiting the opening movement of said lid to about perpendicular to said closed position;
6) multiple legs for supporting said portable sink in an upright position, position;
7) a hanging assembly provided under said floor of said body portion, said hanging assembly being adapted to support one or more auxiliary items thereon;
8) a hanging assembly provided under said floor of said body portion, said hanging assembly being adapted to support one or more funnels or strainers capable of having a second hose connected thereto for directing water flowing out of said drain in a predetermined direction;
9) multiple legs for supporting said body portion in an upright position, wherein said legs are hinged so that they can be moved between an upward tucked position, and a lower extended position;
10) multiple compartments separated by at least one divider;
11) multiple compartments separated by at least one divider, wherein each compartment is provided with its own drain;
12) a skirt extending down from said body portion to enable said floor of said body portion to be elevated such that connections can be made on the underside of said body portion; and
13) a skirt extending down from said body portion to enable said floor of said body portion to be elevated such that connections can be made on the underside of said body portion, wherein at least one cut-out or opening is provided in said skirt to enable a hose to pass through.

18. The method of claim 10, wherein said sink body portion comprises at least one feature taken from the group consisting of:

1) a ledge or divider inside said body portion for supporting said panels;
2) a faucet assembly secured to or capable of being secured to said lid;
3) an opening on said lid through which a hose can be extended into said body portion when said lid is in said open position, wherein with said lid in said closed position, the hose is prevented from extending into said body portion;
4) a support assembly provided on the inside of said lid for supporting a detachable faucet assembly to be located at the end of a hose;
5) a stop connected to said body portion for limiting the opening movement of said lid to about perpendicular to said closed position;
6) multiple legs for supporting said portable sink in an upright position;
7) a hanging assembly provided under said floor of said body portion, said hanging assembly being adapted to support one or more auxiliary items thereon;
8) a hanging assembly provided under said floor of said body portion, said hanging assembly being adapted to support one or more funnels or strainers capable of having a second hose connected thereto for directing water flowing out of said drain in a predetermined direction;
9) multiple legs for supporting said body portion in an upright position, wherein said legs are hinged so that they can be moved between an upward tucked position, and a lower extended position;
10) multiple compartments separated by at least one divider;
11) multiple compartments separated by at least one divider, wherein each compartment is provided with its own drain;
12) a skirt extending down from said body portion to enable said floor of said body portion to be elevated such that connections can be made on the underside of said body portion; and
13) a skirt extending down from said body portion to enable said floor of said body portion to be elevated such that connections can be made on the underside of said body portion, wherein at least one cut-out or opening is provided in said skirt to enable a hose to pass through.

* * * * *